United States Patent
Kohata

(10) Patent No.: US 12,374,151 B2
(45) Date of Patent: Jul. 29, 2025

(54) STORAGE MEDIUM, DETERMINATION METHOD, AND INFORMATION PROCESSING APPARATUS

(71) Applicant: Fujitsu Limited, Kawasaki (JP)

(72) Inventor: Shun Kohata, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 18/308,135

(22) Filed: Apr. 27, 2023

(65) Prior Publication Data
US 2024/0046688 A1     Feb. 8, 2024

(30) Foreign Application Priority Data
Aug. 2, 2022  (JP) .................................. 2022-123482

(51) Int. Cl.
*G06V 40/10*     (2022.01)
*G06V 10/426*    (2022.01)
(Continued)

(52) U.S. Cl.
CPC ............ *G06V 40/10* (2022.01); *G06V 10/426* (2022.01); *G06V 10/761* (2022.01);
(Continued)

(58) Field of Classification Search
CPC ...... G06V 40/10; G06V 20/52; G06V 10/762; G06V 10/761; G06V 10/426; G06V 10/774; G06V 10/764
See application file for complete search history.

(56) References Cited

U.S. PATENT DOCUMENTS

| 7,031,496 B2 * | 4/2006 | Shimano ............... G06F 18/256 |
| | | 382/104 |
| 8,098,888 B1 | 1/2012 | Mummareddy et al. |

(Continued)

FOREIGN PATENT DOCUMENTS

| GB | 2497517 A * | 6/2013 | ............. G01C 11/00 |
| JP | 2012-108798 A | 6/2012 | |

(Continued)

OTHER PUBLICATIONS

Hou et al., "Human tracking over camera networks: a review" (pp. 1-20) (Year: 2017).*

(Continued)

*Primary Examiner* — Manav Seth
(74) *Attorney, Agent, or Firm* — Fujitsu Intellectual Property Center

(57) ABSTRACT

A non-transitory computer-readable storage medium storing a determination program that causes at least one computer to execute a process, the process includes obtaining a plurality of pair images of a person obtained from a overlapping region of images captured by each of a plurality of cameras; generating a directed graph including nodes corresponding to person features obtained from each of a plurality of person images included in the plurality of obtained pair images; acquiring weights of links between the nodes in the generated directed graph based on a number of person images with similar person features between the nodes; and determining a combination of the person features in which a number of the person images with the similar person features in the plurality of pair images is maximized based on the acquired weights of the links.

12 Claims, 28 Drawing Sheets

(51) Int. Cl.
  *G06V 10/74* (2022.01)
  *G06V 10/762* (2022.01)
  *G06V 10/764* (2022.01)
  *G06V 10/774* (2022.01)
  *G06V 20/52* (2022.01)

(52) U.S. Cl.
  CPC .......... *G06V 10/762* (2022.01); *G06V 10/764* (2022.01); *G06V 10/774* (2022.01); *G06V 20/52* (2022.01)

(56) References Cited

U.S. PATENT DOCUMENTS

| | | | | |
|---|---|---|---|---|
| 8,432,449 | B2 * | 4/2013 | Chen | G06T 7/292 |
| | | | | 382/116 |
| 9,836,668 | B2 * | 12/2017 | Ikeda | G06F 18/22 |
| 12,299,036 | B2 * | 5/2025 | Hunter | G06N 3/08 |
| 2020/0151546 | A1 | 5/2020 | Liu et al. | |

FOREIGN PATENT DOCUMENTS

| | | | | |
|---|---|---|---|---|
| JP | 2018-061114 A | | 4/2018 | |
| JP | 2019-029021 A | | 2/2019 | |
| JP | 2020-091664 A | | 6/2020 | |
| WO | WO-2018177609 A1 * | | 10/2018 | ............... G06T 7/85 |

OTHER PUBLICATIONS

Guan'an Wang et al.,"High-Order Information Matters: Learning Relation and Topology for Occluded Person Re-Identification", 2020 IEEE/CVF Conference on Computer Vision and Pattern Recognition (CVPR), IEEE, Jun. 13, 2020 (Jun. 13, 2020), pp. 6448-6457, XP033805501. Cited in EESR dated Nov. 24, 2023 for corresponding European Patent Application No. 23170031.1.

Zahra Mortezaie et al.,"People re-identification under occlusion and crowded background", Multimedia Tools and Applications, Kluwer Academic Publishers, Boston, US, vol. 81, No. 16, Mar. 19, 2022 (Mar. 19, 2022), pp. 22549-22569, XP037880199. Cited in EESR dated Nov. 24, 2023 for corresponding European Patent Application No. 23170031.1.

Shun Takeuchi et al.,"Unsupervised Domain-Adaptive Person Re-Identification With Multi-Camera", 2022 IEEE International Conference on Image Processing (ICIP), IEEE, Oct. 16, 2022 (Oct. 16, 2022), pp. 1636-1640, XP034293150. Cited in EESR dated Nov. 24, 2023 for corresponding European Patent Application No. 23170031.1.

Mchao Yan et al.,"Learning Context Graph for Person Search", arxiv.org, Cornell University Library, 201 Olin Library Cornell University Ithaca, NY 14853, Apr. 3, 2019 (Apr. 3, 2019), XP081164291. Cited in EESR dated Nov. 24, 2023 for corresponding European Patent Application No. 23170031.1.

EESR—Extended European Search Report dated Nov. 24, 2023 for European Patent Application No. 23170031.1 [9 pages].

\* cited by examiner

FIG. 18
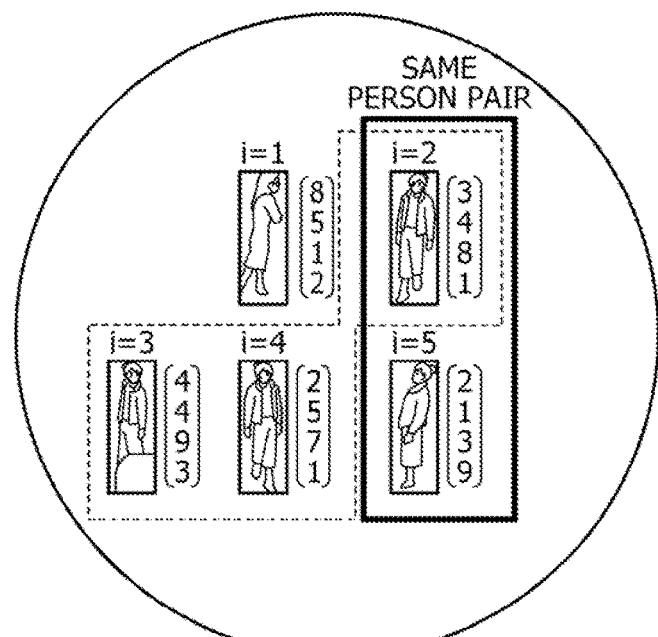
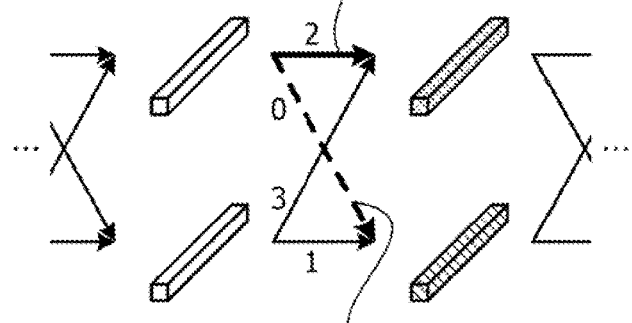
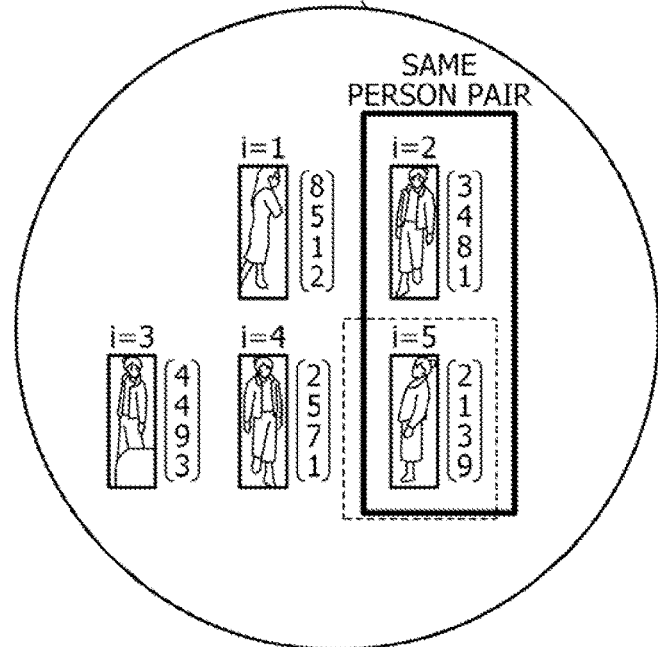

FIG. 27

|  | TRAINING DATA | INFERENCE DATA | MATCHING RATIO (TOP RANK) |
|---|---|---|---|
| REFERENCE TECHNIQUE 3 | DATASET A | DATASET B | 93.2 |
| EMBODIMENT 1 | | | 94.0 (IMPROVED) |

|  | TRAINING DATA | INFERENCE DATA | MATCHING RATIO (TOP RANK) |
|---|---|---|---|
| REFERENCE TECHNIQUE 3 | DATASET B | DATASET A | 81.9 |
| EMBODIMENT 1 | | | 82.3 (IMPROVED) |

|  | TRAINING DATA | INFERENCE DATA | MATCHING RATIO (TOP RANK) |
|---|---|---|---|
| REFERENCE TECHNIQUE 3 | DATASET B | DATASET C | 81.9 |
| EMBODIMENT 1 | | | 65.1 (IMPROVED) |

|  | TRAINING DATA | INFERENCE DATA | MATCHING RATIO (TOP RANK) |
|---|---|---|---|
| REFERENCE TECHNIQUE 3 | DATASET A | DATASET C | 64.0 |
| EMBODIMENT 1 | | | 66.9 (IMPROVED) |

STORAGE MEDIUM, DETERMINATION METHOD, AND INFORMATION PROCESSING APPARATUS

CROSS-REFERENCE TO RELATED APPLICATION

This application is based upon and claims the benefit of priority of the prior Japanese Patent Application No. 2022-123482, filed on Aug. 2, 2022, the entire contents of which are incorporated herein by reference.

FIELD

The embodiments discussed herein are related to a storage medium, a determination method, and an information processing apparatus.

BACKGROUND

Along with a change in lifestyle and a shortage of labor, a purchase behavior analysis using monitoring cameras in a store is used for purpose of automation and an increase in efficiency of store operations. Examples of the purchase behavior analysis include estimating purchase characteristics of consumers by analyzing behaviors from shopping statuses in a store and detecting suspicious behaviors in a store having a self-checkout counter to achieve obtaining of new customers and an increase in efficiency of the store operations. Analyzing behaviors from shopping statuses refers to analyzing which merchandise in the store a target consumer purchases, and the suspicious behavior detection refers whether a person leaves a store without scanning merchandise put in a shopping basket.

In recent years, a person tracking technique using multiple monitoring cameras installed in a store has been used to analyze purchase behaviors in various stores. As this person tracking technique, there is known a technique of tracking the same person in which a person detection model and a person identification model are combined. For example, in the technique of tracking the same person, a bounding box is detected from an image of each monitoring camera by using the person detection model, and whether or not the bounding boxes of the persons in the respective frames of the respective monitoring cameras are the same person or not is identified by using the person identification model.

Japanese Laid-open Patent Publication Nos. 2019-29021 and 2018-61114 are disclosed as related art.

SUMMARY

According to an aspect of the embodiments, a non-transitory computer-readable storage medium storing a determination program that causes at least one computer to execute a process, the process includes obtaining a plurality of pair images of a person obtained from a overlapping region of images captured by each of a plurality of cameras; generating a directed graph including nodes corresponding to person features obtained from each of a plurality of person images included in the plurality of obtained pair images; acquiring weights of links between the nodes in the generated directed graph based on a number of person images with similar person features between the nodes; and determining a combination of the person features in which a number of the person images with the similar person features in the plurality of pair images is maximized based on the acquired weights of the links.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram explaining calculation of weights of links;

FIG. 27 is a diagram explaining effects according to the embodiment 1; and

DESCRIPTION OF EMBODIMENTS

In the above-described technique, image characteristics of training data for each of the models used in the person tracking technique and image characteristics of image data captured in the store to which the person tracking technique is actually applied are often different from one another. In this case, inference accuracy of the person identification model decreases, and erroneous identification of a person occurs.

For example, an angle of view and brightness of monitoring cameras vary depending on stores to which the technique is applied. Clothing also changes due to seasons and trends, and a customer class such as age and race as well as a background such as colors and patterns of store shelves, floors, and columns vary depending on the stores. The number of combinations of such image characteristics are enormous, and training all combinations is not realistic.

Since it is unrealistic to prepare a dataset of training data used for training of each of the models for each of stores in practice, a public dataset that is open to public is generally used in many cases.

For example, the person detection model is constructed by deep learning or the like such that image data is inputted into the person detection model and the person detection model estimates a position where a person is present in the image data and outputs an area (bounding box) of this position. The person identification model is constructed by deep learning or the like such that image data in which two bounding boxes of persons are designated are inputted into the person identification model and the person identification model outputs features (feature vectors) of these persons. Hereinafter, the image data in which the bounding box is designated is sometimes referred to as a "bounding box image".

As described above, although it is preferable to obtain bounding box images capturing the same person from various angles for a large number of persons as the training data for each model, obtaining a training dataset in an actual environment is costly. Covering the image characteristics of various stores with the public dataset is also difficult.

According to an aspect, an object is to provide a determination program, a determination method, and an information processing apparatus that are capable of suppressing erroneous identification of a person.

According to one embodiment, it is possible to suppress erroneous identification of a person.

Hereinafter, embodiments of a determination program, a determination method, and an information processing apparatus disclosed in the present application are described in detail based on the drawings. This disclosure is not limited by the embodiments. Each of the embodiments may be appropriately combined with another embodiment within a scope without contradiction.

Embodiment 1

[Overall Configuration]

Figure 1:
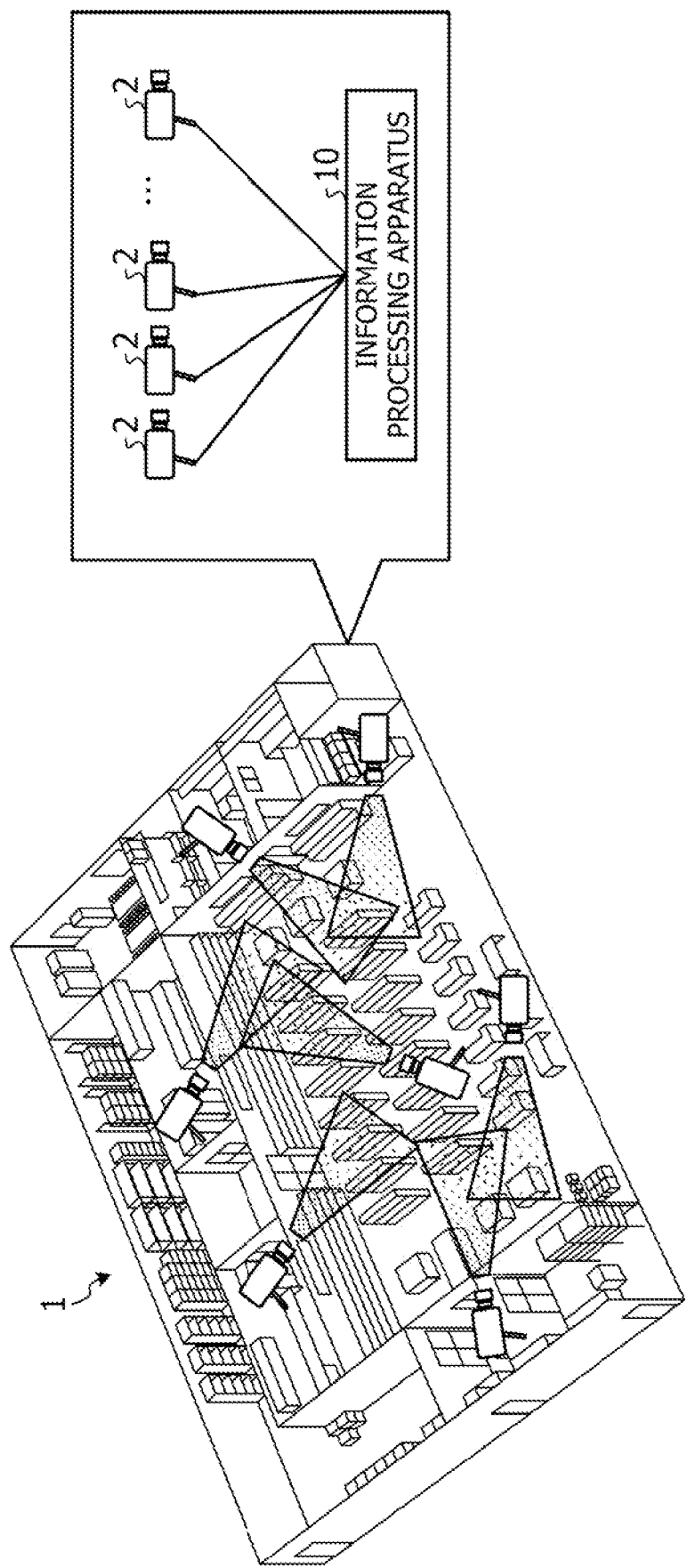
FIG. 1 is a diagram illustrating an example of an overall configuration of a system according to an embodiment 1.

FIG. 1 is a diagram illustrating an example of an overall configuration of a system according to an embodiment 1. As illustrated in FIG. 1, this system includes a store 1 that is an example of a space, multiple cameras 2 installed at different locations in the store 1, and an information processing apparatus 10.

Each of the multiple cameras 2 is an example of a monitoring camera that captures a video of a predetermined region in the store 1, and transmits data of the captured video to the information processing apparatus 10. In the following description, data of video is referred to as "video data" in some cases. The video data includes multiple time-series image frames. Frame numbers are assigned to the respective image frames in ascending chronological order. One image frame is image data of a still image captured by the camera 2 at a certain timing.

The information processing apparatus 10 is an example of a computer that analyzes each piece of image data captured by each of the multiple cameras 2. Each of the multiple cameras 2 and the information processing apparatus 10 are coupled to each other by using various networks such as the Internet and a dedicated line, and the coupling may be wired or wireless. A normal checkout counter, a self-checkout counter, and the like are installed in the store 1, and a store clerk holds a terminal such as a smartphone.

Figure 2:
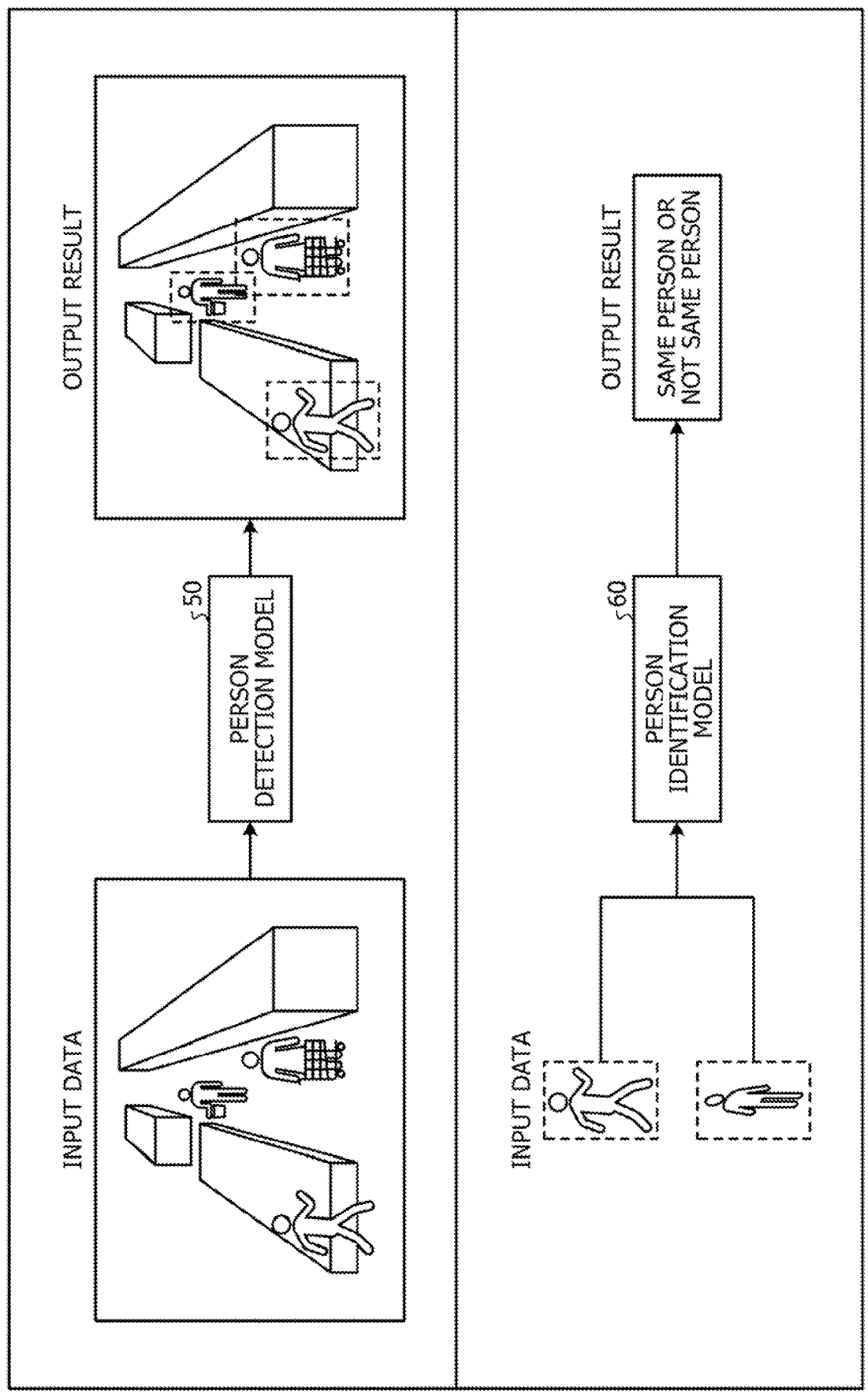
FIG. 2 is a diagram explaining a reference technique 1 of a person tracking technique.

In recent years, in various stores (for example, stores introducing self-checkout counters or the like), a person tracking technique using multiple monitoring cameras installed in a store is used to analyze purchase behaviors in the store. FIG. 2 is a diagram explaining a reference technique 1 of a person tracking technique. As illustrated in FIG. 2, the person tracking technique is a technique of tracking the same person in which a person detection model 50 and a person identification model 60 are combined.

The person detection model 50 detects a person bounding box (Bbox) indicating a position where a person is present, and outputs the person bounding box as an output result, in response to an input of the image data of each camera 2. In response to an input of two person bounding boxes detected from pieces of image data of the respective cameras, the person identification model 60 outputs a determination result of whether or not persons in the person bounding boxes are the same person by performing similarity evaluation or distance evaluation of features (feature vectors) of these persons.

However, in an actual operation, accuracy of the person identification model 60 decreases when an image characteristic of training data used for machine learning (training) of the person identification model and an image characteristic of actual image data captured by each camera 2 vary from each other. Since installation positions of the respective cameras 2 vary from each other, the angle of view of the camera, brightness, background, and the like also vary, and thus the accuracy of the person identification model 60 decreases in a situation where an environment of the training data and an environment of the actual operation do not coincide with each other.

For example, when the image characteristic of the training data for person identification and the image characteristic of the actual store being an inference target do not coincide with each other, a person feature distribution fluctuates. Accordingly, inference accuracy of person features decreases, and a person is erroneously identified. Such erroneous identification makes tracking of the same person using the image data captured by the cameras 2 difficult, and the purchase behaviors may not be accurately analyzed.

Accordingly, in a reference technique 2 of the person tracking technique, since a floor map and camera arrangement of the store 1 are obtainable, training data for person identification in an inference target store is obtained by using an overlapping portion of image capturing regions of multiple cameras and paying attention on such a characteristic that person bounding boxes at the same position captured by the respective cameras 2 at the same time are the same person. Executing machine learning of the person identification model by using the training data obtained as described above reduces an influence of the image characteristics, and suppresses erroneous identification of a person.

Figure 3:
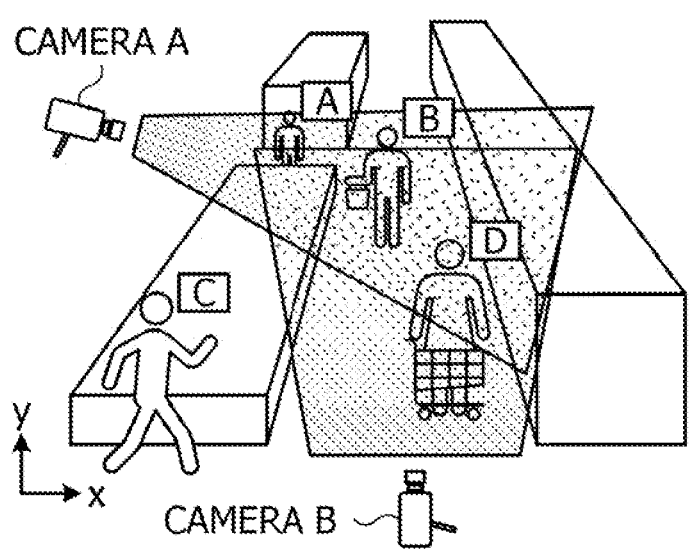
FIG. 3 is a diagram explaining generation of training data using an actual video of a store.

FIG. 3 is a diagram explaining generation of the training data using an actual video of the store 1. As illustrated in FIG. 3, the cameras 2 installed in the store 1 capture images, respectively, from different positions in different directions, but image capturing target regions thereof are partially common (overlap one another). For example, a person A and a person B are captured in image data captured by a camera A, the person A, the person B, and a person D are captured in image data captured by a camera B, and the person A and the person B are commonly captured by each camera. Accordingly, although determination of "who is the person" may not be performed for each of the person A and the person B, each of the person A and the person B may be determined as the same person. The images of the person A and the person B are captured in different directions, and are not the same pieces of image data.

For example, multiple pieces of image data of the same person that are captured in different directions may be collected by using the pieces of video data of the cameras 2 in the store. In the reference technique 2 described above, the machine learning of the person identification model is executed by using the pieces of image data of the same person captured, respectively, in different directions, as the training data.

Figure 4:
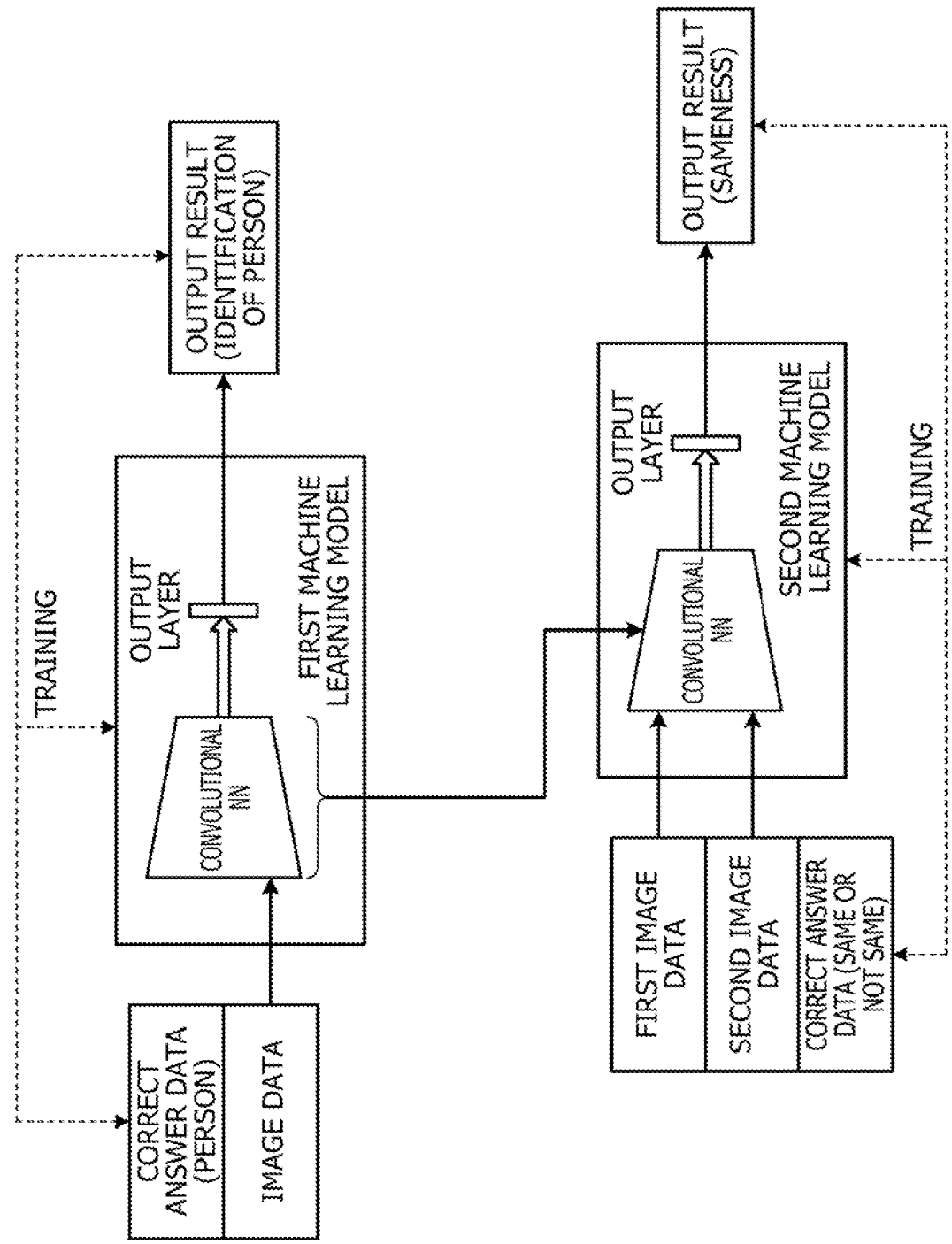
FIG. 4 is a diagram explaining a reference technique 2 of the person tracking technique.

FIG. 4 is a diagram explaining the reference technique 2 of the person tracking technique. As illustrated in FIG. 4, in the reference technique 2, training data in which image data and correct answer data (person label) are associated with each other is obtained from a publicly-available public dataset or the like. In the reference technique 2, for example, the image data is inputted into a first machine learning model formed of a convolutional neural network to obtain an output result, and training of a first machine learning model is executed such that the output result coincides with the correct answer data. For example, in the reference technique 2, the first machine learning model is generated by machine learning of a multiclass classification problem using training data related to multiple persons.

Then, in the reference technique 2, a second machine learning model is generated by using an input layer and an intermediate layer of the trained first machine learning model and a new output layer. In the reference technique 2, training data in which a same person label (correct answer data) is assigned is generated by using first image data and second image data that are pieces of image data of the same person generated from the image data of the store. In the reference technique 2, the first image data and the second image data in the training data generated from the image data of the store are inputted into the second machine learning model to obtain an output result including a determination result of sameness, and training of the second machine learning model is executed such that the output result coincides with the correct answer data. For example, in the reference technique 2, the second machine learning model is generated by machine learning of a binary classification problem using training data on a predetermined person. Hereinafter, the first image data and the second image data that are the pieces of image data of the same person generated from the image data of the store may be referred to as a "pair image of the same person" or a "pair image". Hereinafter, each of the first image data and the second image data that are elements included in the pair image of the same person may be referred to as a "sample".

According to the reference technique 2, executing the person identification by using the second machine learning model generated as described above may achieve training of the person features suitable for a store being an inference target, improve the person tracking accuracy, and achieve purchase behavior analysis with high accuracy.

Figure 5:
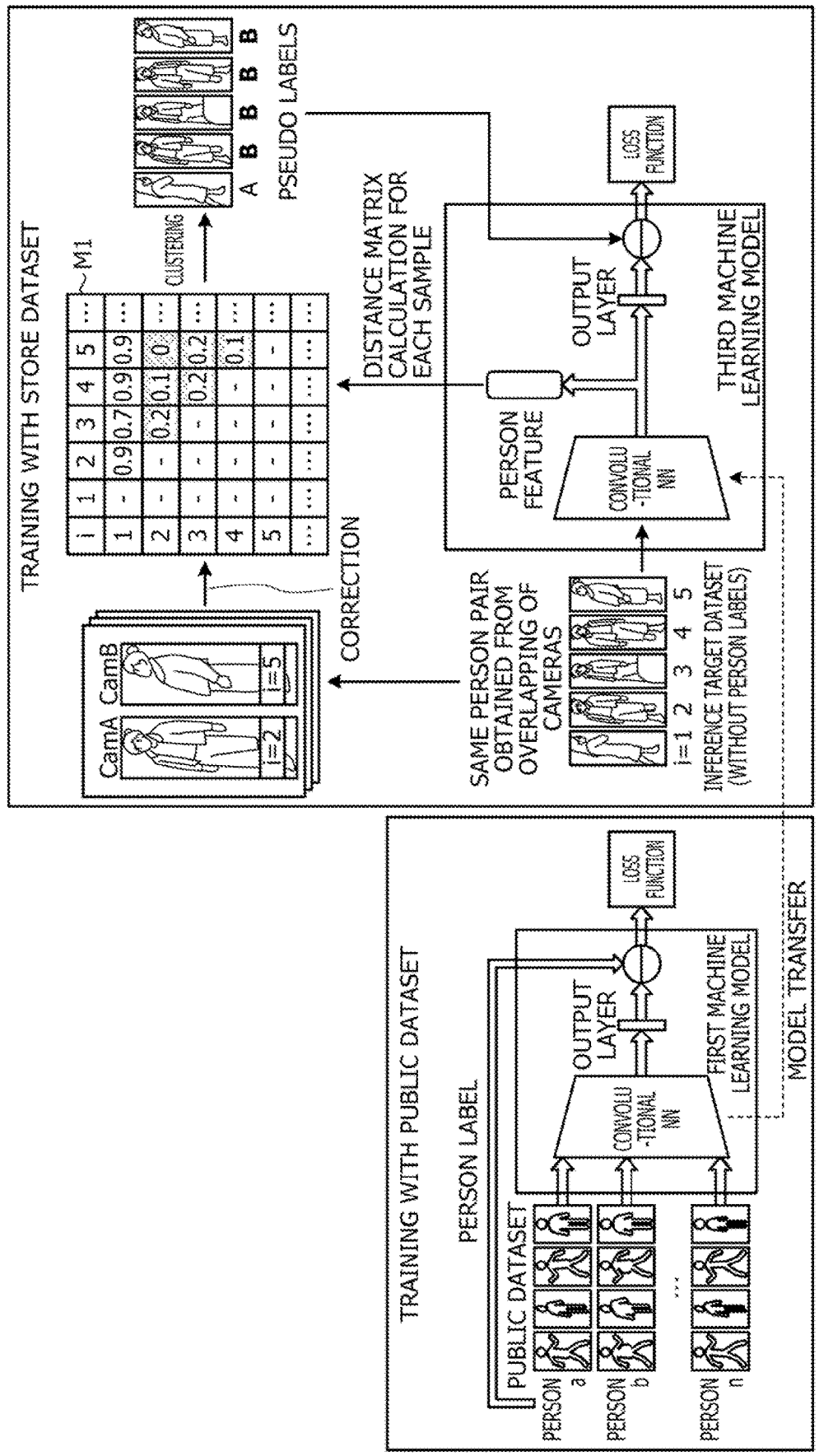
FIG. 5 is a diagram explaining a reference technique 3 of the person tracking technique.

As an application example of the reference technique 2, there is a reference technique 3 described below. FIG. 5 is a diagram explaining the reference technique 3 of the person tracking technique. As illustrated in FIG. 5, the reference technique 3 is in common with the reference technique 2 described by using FIG. 4 in that the first machine learning model is generated by training of the multiclass classification problem using the training data obtained from the publicly-available public dataset or the like. Meanwhile, the reference technique 3 is different from the reference technique 2 in that a third machine learning model different from the second machine learning model is generated by using the input layer and the intermediate layer of the trained first machine learning model and a new output layer.

Description is given of this point. In the reference technique 3, a distance matrix M1 of the person features is generated by using a dataset of N pair images including pairs of bounding box images of the same person extracted based on the overlapping portion of the image capturing regions of the multiple cameras 2 in the store 1.

For example, each of the samples included in each of the N pair images is inputted into a convolution neural network (NN) to which the input layer and the intermediate layer of the trained first machine learning model are transferred. The convolution NN into which the samples are inputted as described above outputs the person features (feature vectors) obtained by embedding the samples in a feature space. The person feature of each of the 2N samples included in the dataset of the N pair images is thereby obtained.

In the reference technique 3, the distance matrix M1 is generated by calculating, for each of combinations of 2N samples, a person feature distance (cosine distance or the like) between the samples. In this case, in the reference technique 3, the person feature of one of the paired samples included in the same pair image is selected based on the dataset of the pair images, and the person feature of the other sample that is not selected is replaced with the person feature of the selected sample. Correction of the person features in which the person features are unified between the samples in the pair image is executed as described above, and then the person feature distance between the samples are calculated for each of the combinations of 2N samples to generate the distance matrix M1. Although the example in which the distance is calculated is described, a degree of similarity between the samples may be calculated instead of the distance.

Then, in the reference technique 3, the 2N samples included in the dataset of the N pair images are clustered based on the distance matrix M1.

For example, FIG. 5 illustrates a case where clustering is executed by using a distance matrix M1 with five rows and five columns in which five samples of i=1 to i=5 are extracted and depicted. Description is given of an example in which two clusters are merged if the distance between the two clusters is equal to or smaller than a threshold Th1 (0.2) in this case.

In this case, since the sample of i=1 has no sample the distance to which is equal to or smaller than the threshold Th1, the sample of i=1 is left as one cluster without being merged with any other cluster. Meanwhile, as indicated by hatching, since the distances are equal to or smaller than the threshold Th1 in all of combinations of the four samples of i=2 to i=5, each of the samples of i=2 to i=5 is merged into one cluster.

In the reference technique 3, a pseudo label A is generated for the cluster to which the sample of i=1 belongs out of the two clusters obtained as a result of the clustering, and a pseudo label B is generated for the cluster to which the four samples of i=2 to i=5 belong. Training data in which the person features of the 2N samples included in the dataset of the N pair images and the pseudo labels are associated with one another is generated based on the pseudo labels generated as described above.

Then, in the reference technique 3, the third machine learning model including a new output layer and the convolution NN to which the input layer and the intermediate layer of the trained first machine learning model are transferred is trained with the person features of the 2N samples being explanatory variables and the pseudo labels being objective variables.

For example, a person feature of a sample is inputted into the third machine learning model to obtain an output result including a label of a class corresponding to a category of the pseudo label, and training of the third machine learning model is executed such that the output result coincides with a correct pseudo label. For example, parameters of the third machine learning model are updated by optimizing an objective function based on the output result of the third machine learning model and the correct pseudo label. For example, the parameters of the third machine learning model may be updated based on a loss function that minimizes a loss and that is obtained from the output result and the correct pseudo label.

However, in the reference technique 3 described above, in the correction of the person features in which the person features are unified between the samples of the pair image, there is a case where the person features are corrected to a person feature of an unsuitable sample out of the two samples. Accordingly, the reference technique 3 has an aspect in which the accuracy of the pseudo label decreases and the person is erroneously identified.

Figure 6:
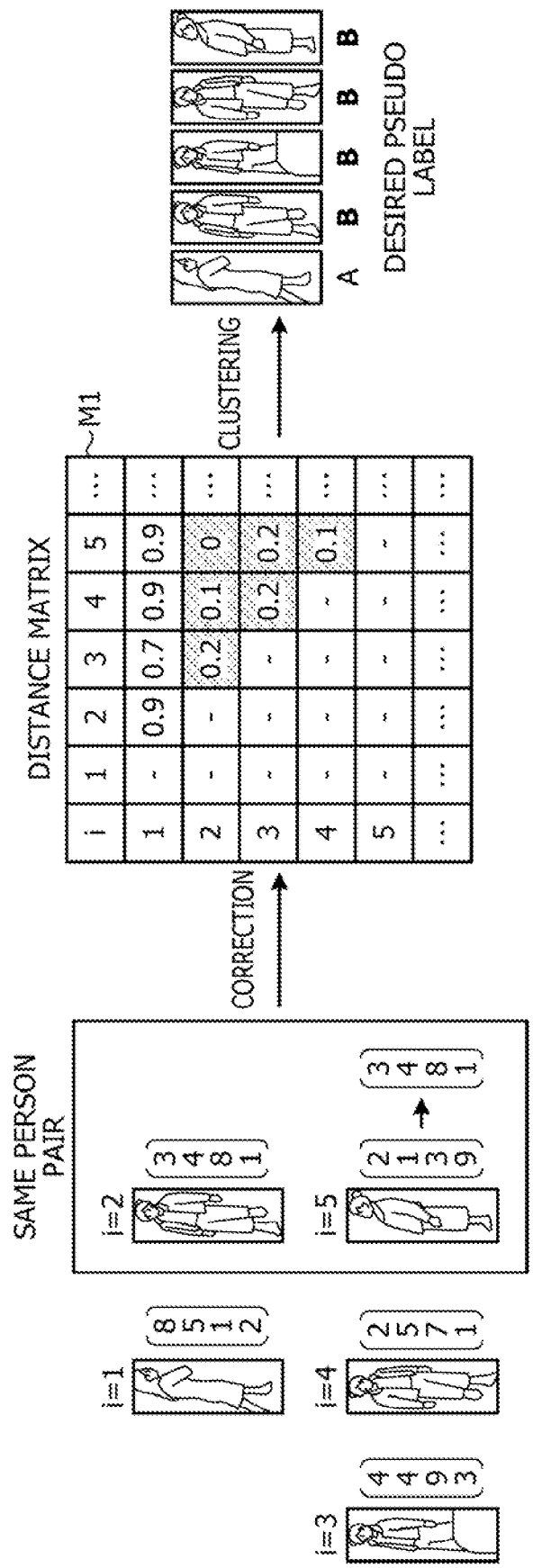
FIG. 6 is a diagram explaining a generation case of pseudo labels.
Figure 7:
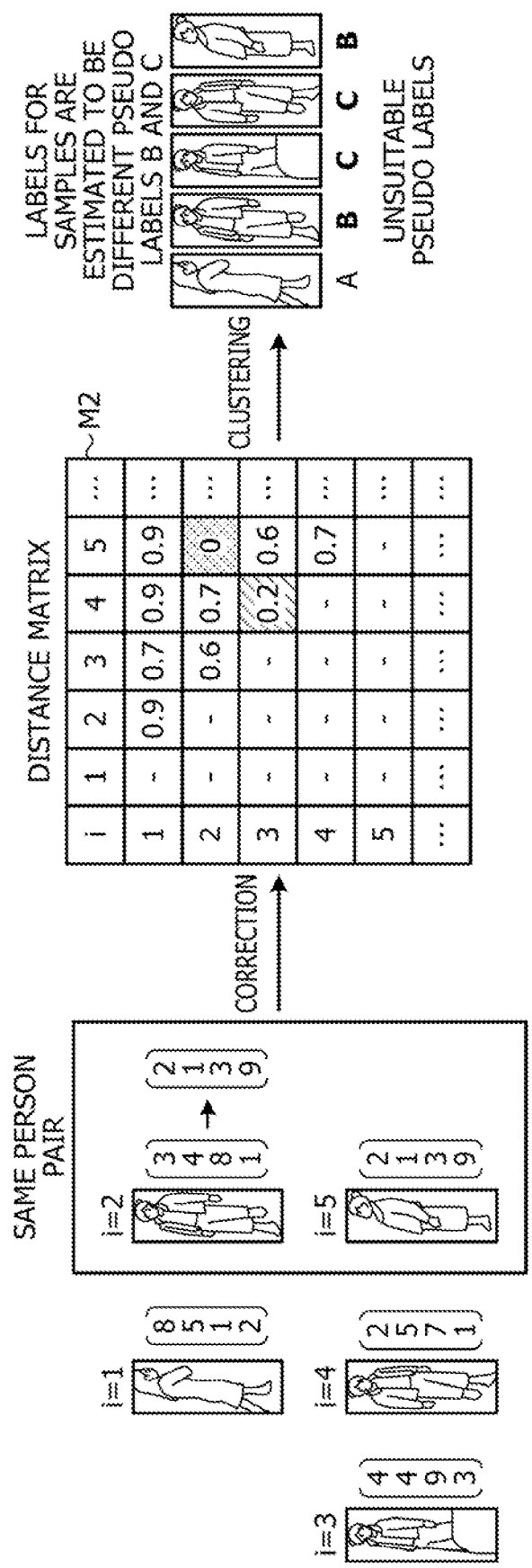
FIG. 7 is a diagram explaining the generation case of the pseudo labels.

FIGS. 6 and 7 are diagrams explaining a generation case of the pseudo labels. FIGS. 6 and 7 illustrate a pair image including a pair of the sample of i=2 and the sample of i=5 illustrated in FIG. 5, as an example of the pair image of the same person. FIG. 6 illustrates an OK example in which selection of a sample to be used for the correction out of the two samples in the pair image is successful, and generation of pseudo labels is successful. Meanwhile, FIG. 7 illustrates an NG example in which selection of a sample to be used for the correction out of the two samples in the pair image fails, and generation of pseudo labels fails.

Description continues below on the assumption that the four samples of i=2 to i=5 among the five samples of i=1 to i=5 illustrated in FIGS. 5 to 7 are bounding box images of the same person.

For example, in the case of the example illustrated in FIG. 6, the sample of i=2 is selected as the sample to be used for the correction, out of the two samples in the pair image. In this case, the person feature of the sample of i=5 that is not selected as the sample to be used for the correction is corrected to the person feature of the sample of i=2 that is selected as the sample to be used for the correction.

After execution of such correction, the person feature distance between the samples are calculated for each of combinations of the five samples of i=1 to i=5, and the distance matrix M1 is thereby generated. When clustering of the five samples of i=1 to i=5 is executed based on this distance matrix M1, generation of the pseudo labels is successful as in the example illustrated in FIG. 5. For example, a pseudo label A is generated for a cluster to which the sample of i=1 belongs, and a pseudo label B is generated for a cluster to which the four samples of i=2 to i=5 belong.

When the person feature of the sample of i=2 is selected as the sample to be used for the correction as described above, the same pseudo label B may be assigned to the four samples of i=2 to i=5, and the generation of the pseudo labels is thus successful.

Meanwhile, in the case of the example illustrated in FIG. 7, the sample of i=5 is selected as the sample to be used for the correction, out of the two samples in the pair image. In this case, the person feature of the sample of i=2 that is not selected as the sample to be used for the correction is corrected to the person feature of the sample of i=5 that is selected as the sample to be used for the correction.

After execution of such correction, the person feature distance between the samples are calculated for each of the combinations of the five samples of i=1 to i=5, and a distance matrix M2 is thereby generated. When clustering of the five samples of i=1 to i=5 is executed based on this distance matrix M2, the result is as follows.

For example, since the sample of i=1 has no sample the distance to which is equal to or smaller than the threshold Th1, the sample of i=1 is left as one cluster without being merged with any other cluster. Since the person feature of the sample of i=2 is replaced with the person feature of the sample of i=5, a distance between the person feature of the sample of i=2 and the person feature of the sample of i=5 is zero. The sample of i=2 has no sample the distance to which is equal to or smaller than the threshold Th1, other than the sample of i=5 as described above. Accordingly, the sample of i=2 and the sample of i=5 are classified as the same cluster. The sample of i=3 has the sample of i=4 the distance to which is the threshold Th1. Accordingly, the sample of i=3 and the sample of i=4 are classified as the same cluster.

Among the three clusters obtained as a result of such clustering, a pseudo label A is generated for a cluster to which the sample of i=1 belongs. A pseudo label B is generated for a cluster to which the sample of i=2 and the sample of i=5 belong. A pseudo label C is generated for a cluster to which the sample of i=3 and the sample of i=4 belong.

As described above, when the person feature of the sample of i=5 in the pair image is selected as the sample to be used for the correction, the same pseudo label may not be assigned to the four samples of i=2 to i=5, and the generation of the pseudo labels thus fails.

From a point of view of avoiding the case illustrated in FIG. 7, if the sample to be used for the correction is randomly selected or one of the samples is fixedly selected, selection failure is unavoidable in the selection of the samples to be used for the correction in the respective N pair images, and mixing of unsuitable person features is unavoidable.

Accordingly, in the embodiment 1, when the person feature representing the two samples is to be selected from the pair image of the same person, attention is paid to a characteristic of the number of similar samples for which a person feature distance between the samples is equal to or smaller than a threshold.

The "characteristic" described herein refers to, as one aspect, such finding that samples, for example, bounding box images not belong to a pseudo label of the same category tend to have small numbers of similar samples. For example, there is an aspect in which, when a person feature with a larger number of similar samples is selected, incorporation into the pseudo label of the same category is promoted.

Figure 8:
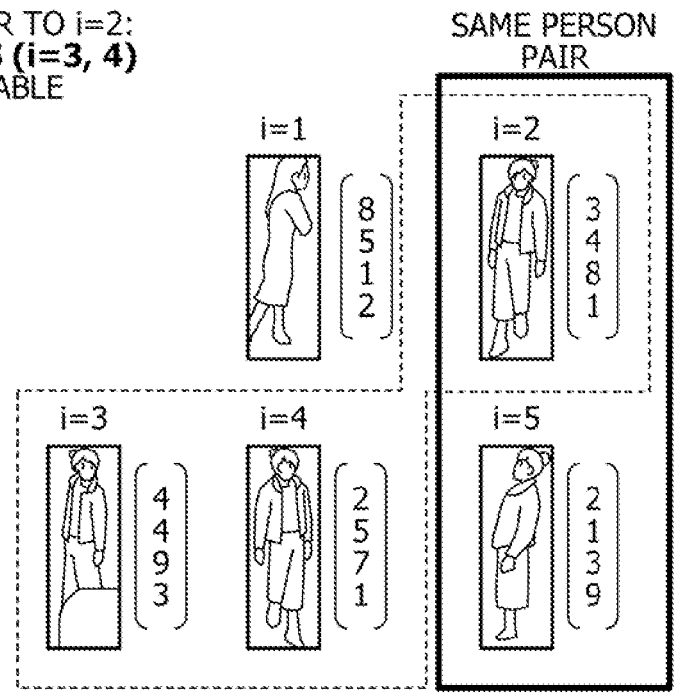
FIG. 8 is a diagram explaining a selection case of a person feature.
Figure 9:
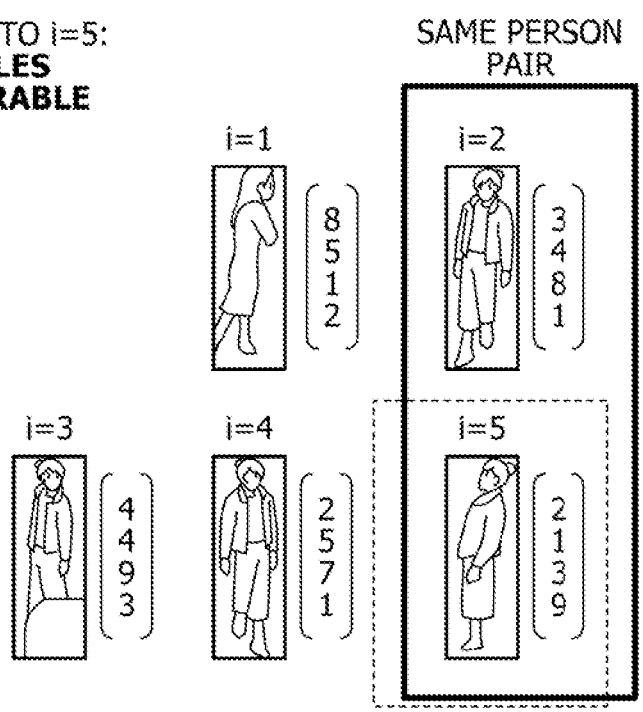
FIG. 9 is a diagram explaining the selection case of the person feature.

FIGS. 8 and 9 are diagrams explaining a selection case of the person feature. FIG. 8 illustrates the number of similar samples in the OK example in which the selection of the sample to be used for the correction out of the two samples in the pair image is successful, while FIG. 9 illustrates the number of similar samples in the NG example in which the selection of the sample to be used for the correction out of the two samples in the pair image fails.

As illustrated in FIG. 8, in the OK example in which the selection of the sample to be used for the correction is successful, the sample of i=2 in the pair image of the same person is selected. In this case, since the sample of i=2 is similar to the sample of i=3 and the sample of i=4, the number of similar samples is "2". Meanwhile, as illustrated in FIG. 9, in the NG example in which the selection of the sample to be used for the correction fails, the sample of i=5 in the pair image of the same person is selected. In this case, since the sample of i=5 has no similar sample, the number of similar samples is "0".

Also from the cases illustrated in FIGS. 8 and 9, it is apparent that the samples belonging to the pseudo label of the same category tend to have many similar samples, and the samples not belonging to the pseudo label of the same category tend to have few similar samples. From this, it is apparent that, when the person feature having the larger number of similar samples is selected, incorporation into the pseudo label of the same category is promoted.

Based on such an idea, in the embodiment 1, a combination pattern of the person features in which the total number of similar samples is maximized in the N pair images as a whole is determined. The samples are clustered by using a distance matrix calculated based on the combination pattern of the person features determined as described above, the pseudo label is assigned to each sample based on a result of the clustering, and the machine learning of the person identification model is executed.

Accordingly, the person feature of the suitable sample is used in the correction of the person features in which the person features are unified between the samples in the pair image, a decrease in accuracy of the pseudo labels is suppressed, and erroneous identification of the person is suppressed.

Figure 10:
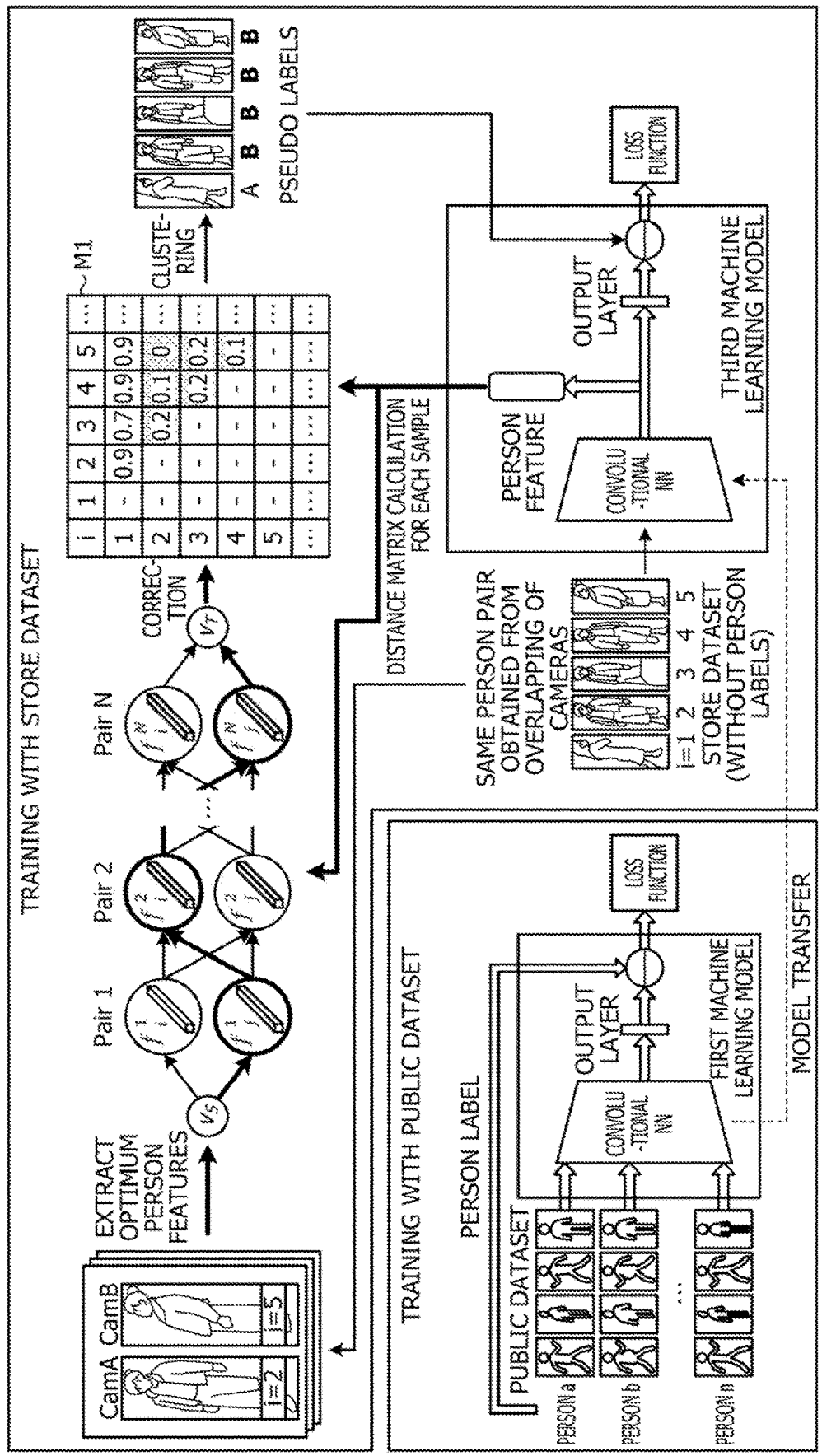
FIG. 10 is a diagram explaining generation of a person identification model used in the person tracking technique according to the embodiment 1.

FIG. 10 is a diagram explaining generation of a person identification model used in the person tracking technique according to the embodiment 1. As illustrated in FIG. 10, the person tracking technique according to the embodiment 1 is in common with the reference technique 3 described by using FIG. 5 in that the first machine learning model is generated by training of the multiclass classification problem by using the training data obtained from a publicly-available public dataset or the like. Meanwhile, the embodiment 1 is different from the reference technique 3 in that, in the determination of the combination pattern of samples in which the sample to be used for the correction is selected for each pair image, there is determined the combination pattern of samples in which the total number of similar samples is maximized in the N pair images as a whole.

Since the calculation of the total number of similar samples is affected by the selection results of the other same person pairs, it is desirable not to compare the numbers in each of the same person pairs but to calculate the combination in which the total number is maximized.

For example, if the total number of similar samples is calculated for all combination patterns in which the sample to be used for the correction is selected for each of the pair images of the same person, a calculation amount increases as the number of pair images of the same person increases. For example, if the number of pair images of the same person is N, since there are two choices of samples for each of the pair images, the calculation amount is $2^N$. In view of this, in the embodiment 1, an approximate solution method is applied to the determination of the combination pattern of the person features, the approximate solution method being a method that achieves calculation amount reduction and generation of pseudo labels with accuracy equivalent to that in the case where the total number of similar samples is calculated for all combination patterns.

In detail, in the embodiment 1, there is defined a directed graph in which two nodes are provided to correspond to the person features of the two samples included in each of the pair images, and the nodes are arranged in order in a direction from a starting point to a terminal point. In this directed graph, child nodes of the respective two nodes of a certain pair image are set to be two nodes of another pair image, and the two parent nodes and the two child nodes are coupled to one another, respectively, by links. The directed graph defined as described above means a path extending from a starting point to a terminal point while adopting one of the samples in each pair image.

In the embodiment 1, the number of similar samples reflecting a selection result of the person feature in an immediately-preceding node is calculated under such a directed graph, and the value of this number is set as the weight of each link. For example, the number of similar samples between an immediately-subsequent node and nodes included in a path up to an immediately-preceding node is calculated as the weight of the link, the immediately-subsequent node being a node coupled to the terminal point side of the link, the immediately-preceding node being a node coupled to the starting point side of the link.

Then, in the embodiment 1, there is formulated a combinatorial optimization problem that determines a combination pattern of nodes, for example, the combination pattern of the person features in which the sum of the weights of the links on the directed graph is maximized, according to an algorithm such as the Dijkstra method. This is equivalent to a combinatorial optimization problem for obtaining an optimum combination from among combinations of weight sums of possible paths in the directed graph. Executing the calculation of the optimization problem formulated as described above achieves determination of the combination pattern of the person features in which the total number of similar samples is maximized in the N pair images as a whole. When the Dijkstra method is applied, the calculation amount for determining the combination pattern of the person features may be reduced to $N^2$.

The person feature to be used for the correction out of the person features of the two samples in each of the N pair images is selected according to the combination pattern of the person features determined as described above.

Accordingly, as in the case illustrated in FIG. 8, the clustering is executed based on the distance matrix M1 calculated in the state where the selection of the person features to be used for the correction is successful. As in the case illustrated in FIG. 6, this allows the pseudo label A to be assigned to the sample of i=1, and the same pseudo label B to be assigned to the four samples of i=2 to i=5, and the generation of the pseudo labels is thus successful.

The third machine learning model including the new output layer and the convolution NN to which the input layer and the intermediate layer of the trained first machine learning model are transferred is trained based on the training data in which the pseudo labels successfully generated as described above are assigned to the samples.

The information processing apparatus 10 executes the person identification by using the third machine learning model trained as described above, and this may suppress a decrease in accuracy of the pseudo labels, improve the person tracking accuracy, and achieve the purchase behavior analysis with high accuracy.

[Functional Configuration]

Figure 11:
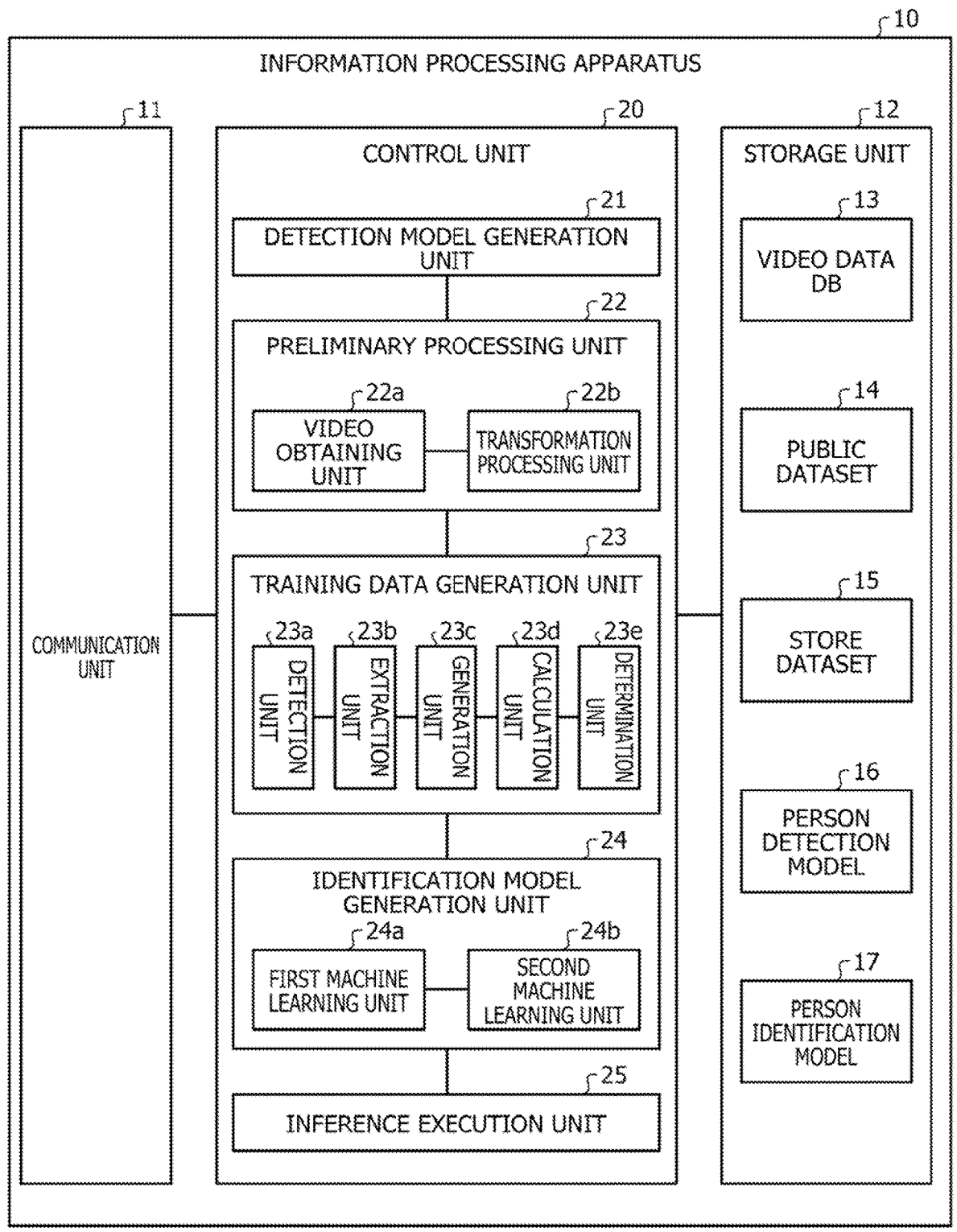
FIG. 11 is a functional block diagram illustrating a functional configuration of an information processing apparatus according to the embodiment 1.

FIG. 11 is a functional block diagram illustrating a functional configuration of the information processing apparatus 10 according to the embodiment 1. As illustrated in FIG. 11, the information processing apparatus 10 includes a communication unit 11, a storage unit 12, and a control unit 20.

The communication unit 11 is a processing unit that controls communication with other apparatuses, and is implemented by, for example, a communication interface or the like. For example, the communication unit 11 receives the video data from the cameras 2, and transmits a result of processing by the control unit 20 to the terminal of the store clerk or the like.

The storage unit 12 is a processing unit that stores various pieces of data, a program executed by the control unit 20, and the like, and is implemented by a memory, a hard disk, or the like. The storage unit 12 stores a video data database (DB) 13, a public dataset 14, a store dataset 15, a person detection model 16, and a person identification model 17.

The video data DB 13 is a database that stores the video data captured by each of the multiple cameras 2 installed in the store 1. For example, the video data DB 13 stores video data for each camera 2 or for each image capturing time slot.

The public dataset 14 stores training data collected in advance. For example, the public dataset 14 stores training data used for machine learning of the person detection model 16 and training data used for machine learning of a multiclass classification problem of the person identification model 17.

For example, the training data used for the machine learning of the person detection model 16 is data in which image data capturing a person and a person bounding box indicating a position where the captured person is present are associated with each other. For example, the image data is an explanatory variable, and the person bounding box is an objective variable (correct answer data).

The training data for the multiclass classification problem is data in which the person bounding box and a person label indicating who the person in the person bounding box is are associated with each other. For example, the person bounding box is an explanatory variable, and the person label is an objective variable (correct answer data).

The store dataset 15 stores training data to be used for the machine learning of the person identification model 17. For example, the store dataset 15 stores training data generated by the control unit 20 to be described later by using the video data of the cameras 2 in the store 1. The training data stored in this case is data in which a person bounding box image and the pseudo label are associated with each other. For example, the person bounding box image is an explanatory variable, and a same person label is an objective variable (correct answer data).

The person detection model 16 is a machine learning model that detects the person bounding box in image data in response to input of the image data and that includes an input layer, an intermediate layer, and an output layer. For example, a convolutional neural network may be adopted as the person detection model 16.

The person identification model 17 is a machine learning model that identifies, in response to input of a person bounding box, which person corresponds to the inputted person bounding box and that includes an input layer, an intermediate layer, and an output layer. For example, a convolutional neural network may be adopted as the person identification model 17.

The control unit 20 is a processing unit that manages the entire information processing apparatus 10, and is implemented by, for example, a processor or the like. The control unit 20 includes a detection model generation unit 21, a preliminary processing unit 22, a training data generation unit 23, an identification model generation unit 24, and an inference execution unit 25. The detection model generation unit 21, the preliminary processing unit 22, the training data generation unit 23, the identification model generation unit 24, and the inference execution unit 25 are implemented by an electronic circuit included in the processor, processes executed by the processor, or the like.

The detection model generation unit 21 is a processing unit that generates the person detection model 16 by machine learning. For example, the detection model generation unit 21 generates the person detection model 16 by updating various parameters such as weights included in the person detection model 16 such that the person bounding box is detected from the inputted training data.

Figure 12:
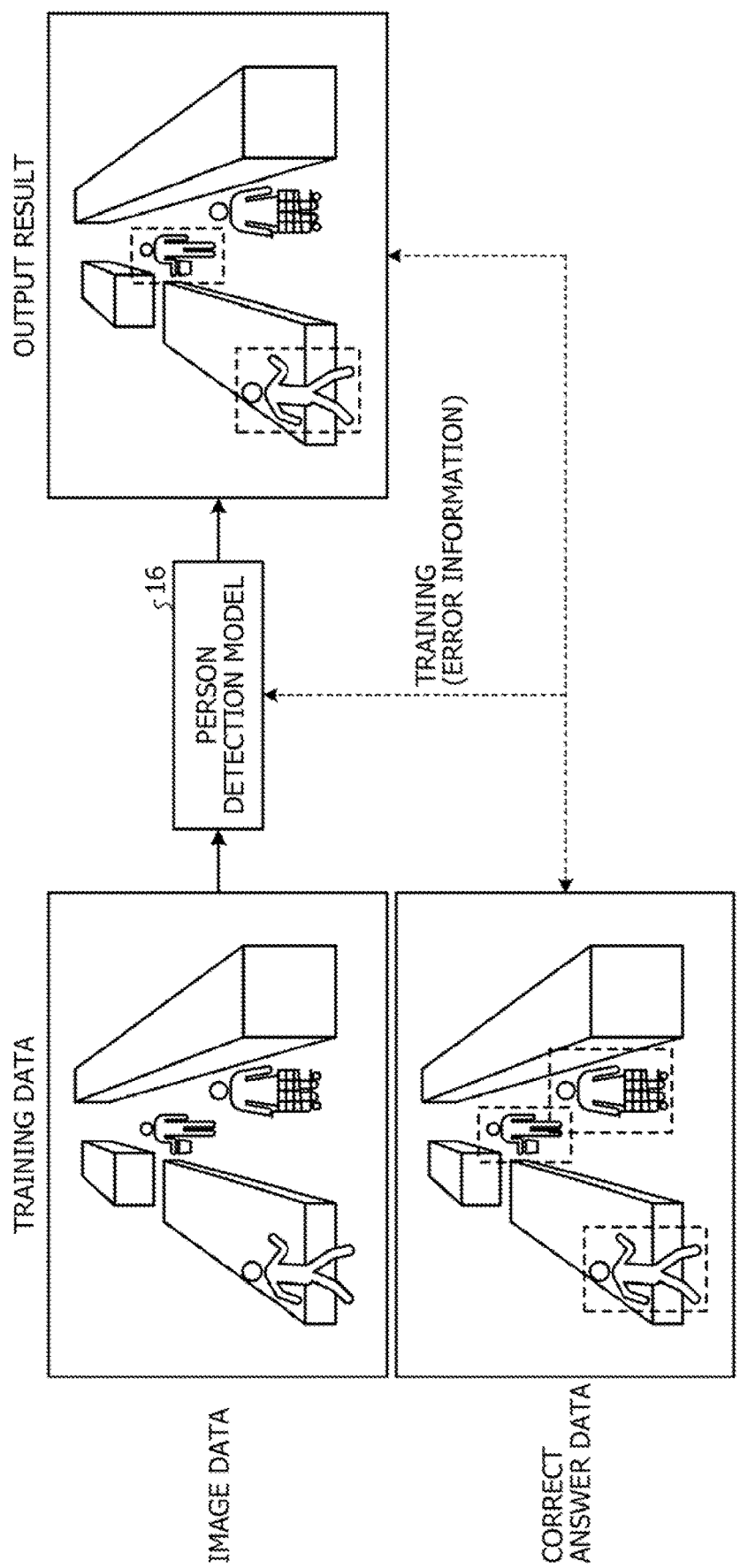
FIG. 12 is a diagram explaining generation of a person detection model.

FIG. 12 is a diagram explaining the generation of the person detection model 16. As illustrated in FIG. 12, the detection model generation unit 21 obtains training data in which image data being an input and correct answer data are associated with each other, from the public dataset 14, the correct answer data being data in which the person bounding boxes are designated. The detection model generation unit 21 inputs the image data into the person detection model 16, and obtains an output result of the person detection model 16. Then, the detection model generation unit 21 executes the machine learning of the person detection model 16 by backpropagation or the like such that an error between the output result and the correct answer data decreases.

The preliminary processing unit 22 includes a video obtaining unit 22a and a transformation processing unit 22b, and is a processing unit that executes preliminary processing for generating the training data of the person identification model 17 from the image data captured in the store 1. For example, the preliminary processing unit 22 estimates a projective transformation coefficient of an image capturing region of each camera 2 with respect to the floor map of the store 1 being an inference target.

The video obtaining unit 22a is a processing unit that obtains the video data from each camera 2 and stores the video data in the video data DB 13. For example, the video obtaining unit 22a may obtain the video data from each camera 2 at any time, or may periodically obtain the video data.

The transformation processing unit 22b is a processing unit that estimates the projective transformation coefficient that varies among the cameras 2 and that is used to transform image coordinates being coordinates of the image data captured by each camera 2, into floor map coordinates being coordinates in the floor map of the store 1 common to the cameras. Since the cameras and the floor configuration are generally fixed, the estimation of the projective transformation (homography) coefficient may be performed once.

Figure 13:
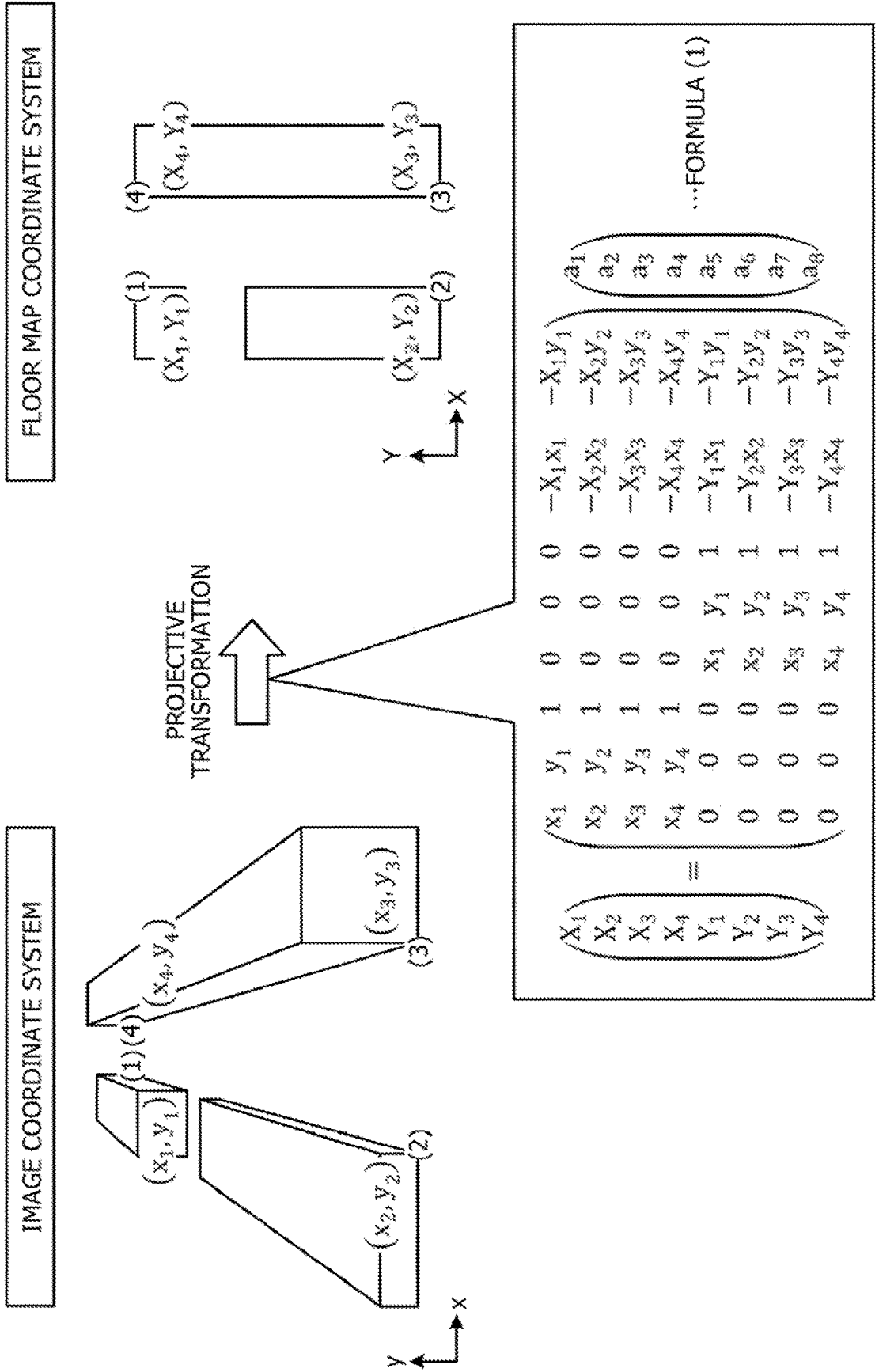
FIG. 13 is a diagram explaining calculation of a projective transformation coefficient.

FIG. 13 is a diagram explaining calculation of the projective transformation coefficient. As illustrated in FIG. 13, the transformation processing unit 22b designates arbitrarily points (corresponding points) that correspond to each other in the camera image (image coordinate system) and the floor map (floor map coordinate system). For example, the transformation processing unit 22b determines a point $(x_1, y_1)$, a point $(x_2, y_2)$, a point $(x_3, y_3)$, and a point $(x_4, y_4)$ in the image coordinate system. Similarly, the transformation processing unit 22b determines a point $(X_1, Y_1)$, a point $(X_2, Y_2)$, a point $(X_3, Y_3)$, and a point $(X_4, Y_4)$ in the floor map coordinate system. Then, the transformation processing unit 22b calculates a projective transformation coefficient $a_i$ (i=1 to 8) from the image coordinate system (x, y) to the floor map coordinate system (X, Y) by solving simultaneous equations illustrated in a formula (1) of FIG. 13. The corresponding points may be designated by a user, or points at the same location may be determined by image analysis.

The training data generation unit 23 includes a detection unit 23a, an extraction unit 23b, a generation unit 23c, a calculation unit 23d, and a determination unit 23e, and is a processing unit that executes person detection and coordinate calculation to generate the training data of the person identification model 17 from the image data of the cameras 2.

Figure 14:
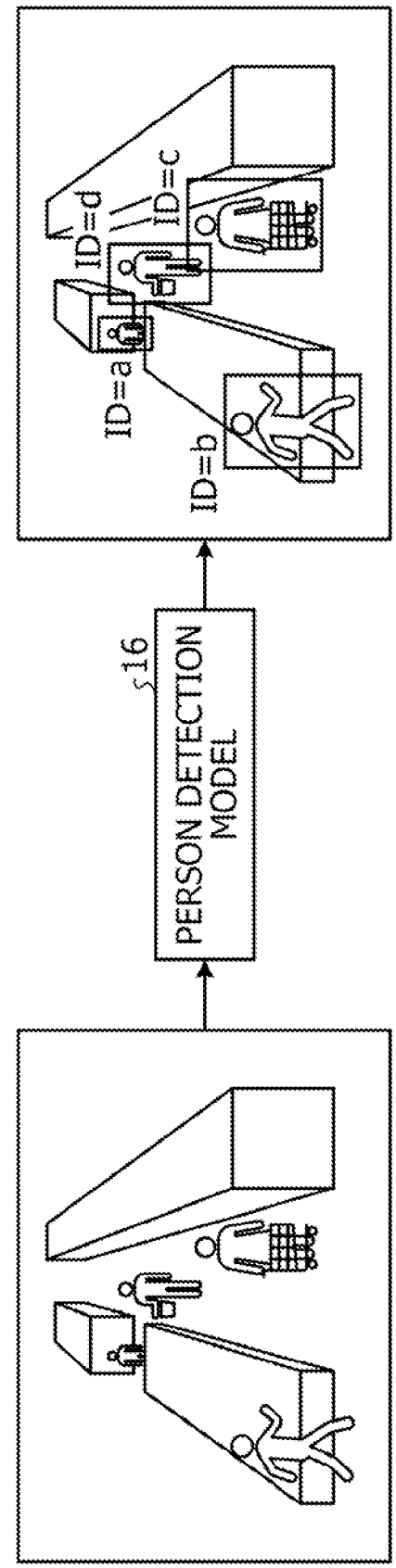
FIG. 14 is a diagram explaining detection of a person bounding box.

The detection unit 23a is a processing unit that detects the person bounding box from the image data captured by each camera 2, by using the trained person detection model 16. FIG. 14 is a diagram explaining the detection of the person bounding box. As illustrated in FIG. 14, the detection unit 23a inputs the image data captured by the camera 2 into the person detection model 16, and obtains an output result in which a person bounding box of ID=a, a person bounding box of ID=b, a person bounding box of ID=c, and a person bounding box of ID=d are detected.

As described above, the detection unit 23a performs the person detection on various pieces of image data captured in different directions by the respective cameras 2 installed at different positions, obtains an output result including the detected person bounding boxes, and stores the output result in the storage unit 12 or the like.

The extraction unit 23b is a processing unit that calculates the floor map coordinates of the person bounding box detected by the detection unit 23a and extracts the pair image of the same person.

Figure 15:
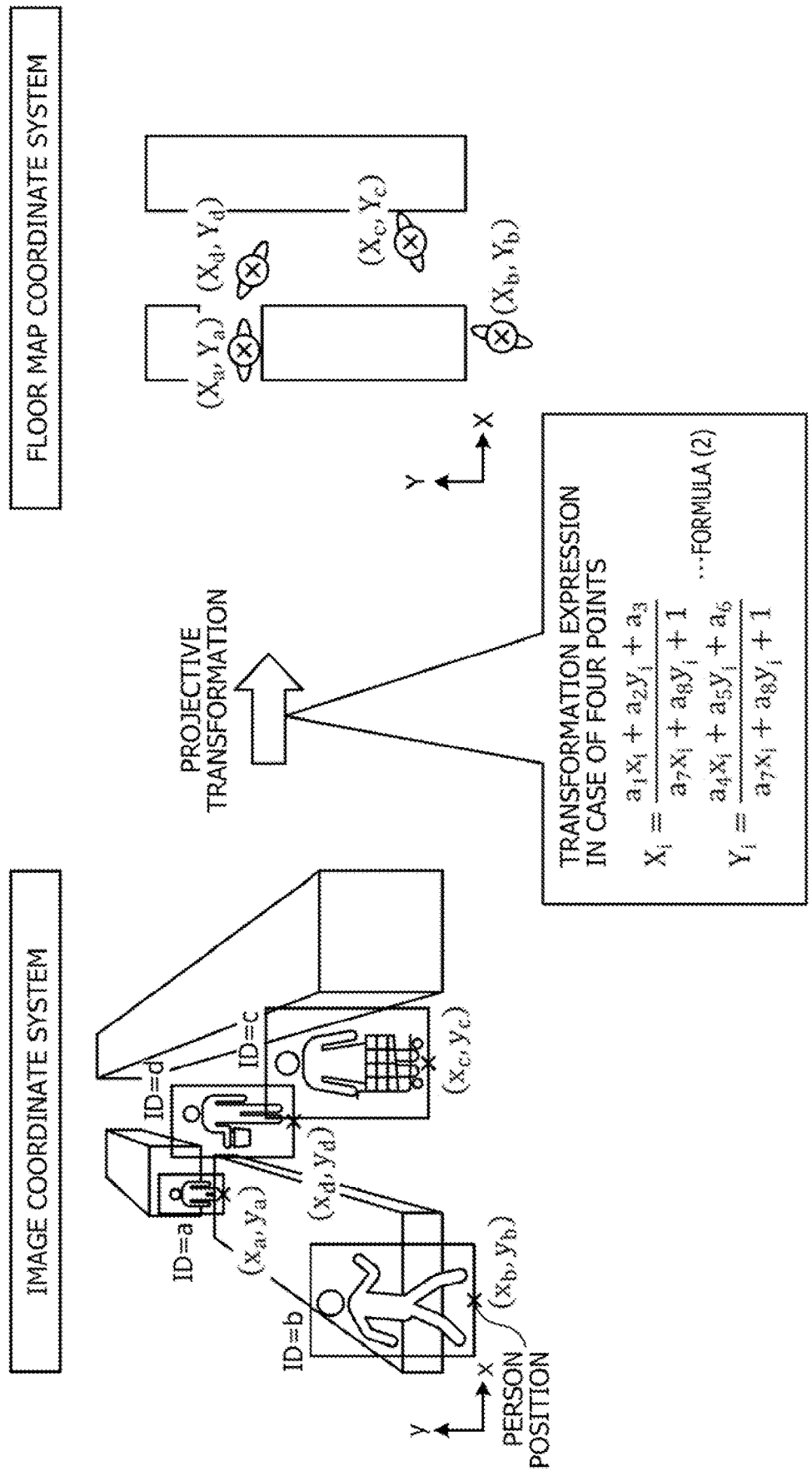
FIG. 15 is a diagram explaining coordinate transformation.

First, the extraction unit 23b transforms the person bounding box in the image coordinate system detected by the detection unit 23a into the floor map coordinate system by using the projective transformation coefficient calculated by the preliminary processing unit 22. FIG. 15 is a diagram explaining coordinate transformation. As illustrated in FIG. 15, the extraction unit 23b sets image coordinates (x, y) of a lower end center of each of person bounding boxes as a person position, and calculates a person position in floor map coordinates (X, Y).

For example, the extraction unit 23b uses transformation expressions illustrated in a formula (2) in FIG. 15 to transform a point $(x_1, y_1)$, a point $(x_2, y_2)$, a point $(x_3, y_3)$, and a point $(x_4, y_4)$ indicating the person positions detected in the image coordinate system, respectively, to a point $(X_1, Y_1)$, a point $(X_2, Y_2)$, a point $(X_3, Y_3)$, and a point $(X_4, Y_4)$ indicating the person positions in the floor map coordinate system. As described above, the extraction unit 23b expresses each of the person bounding boxes captured in the image data of each camera 2 in the image coordinate system unique to the camera, in the floor map coordinate system common to the cameras.

Next, the extraction unit 23b obtains a dataset of paired person bounding box images located at similar floor map coordinates between the two cameras. For example, the extraction unit 23b uses the person bounding boxes in multiple pieces of image data captured at the same time among the pieces of image data of the respective cameras 2 to extract a pair of (paired) person bounding boxes of the same person.

Figure 16:
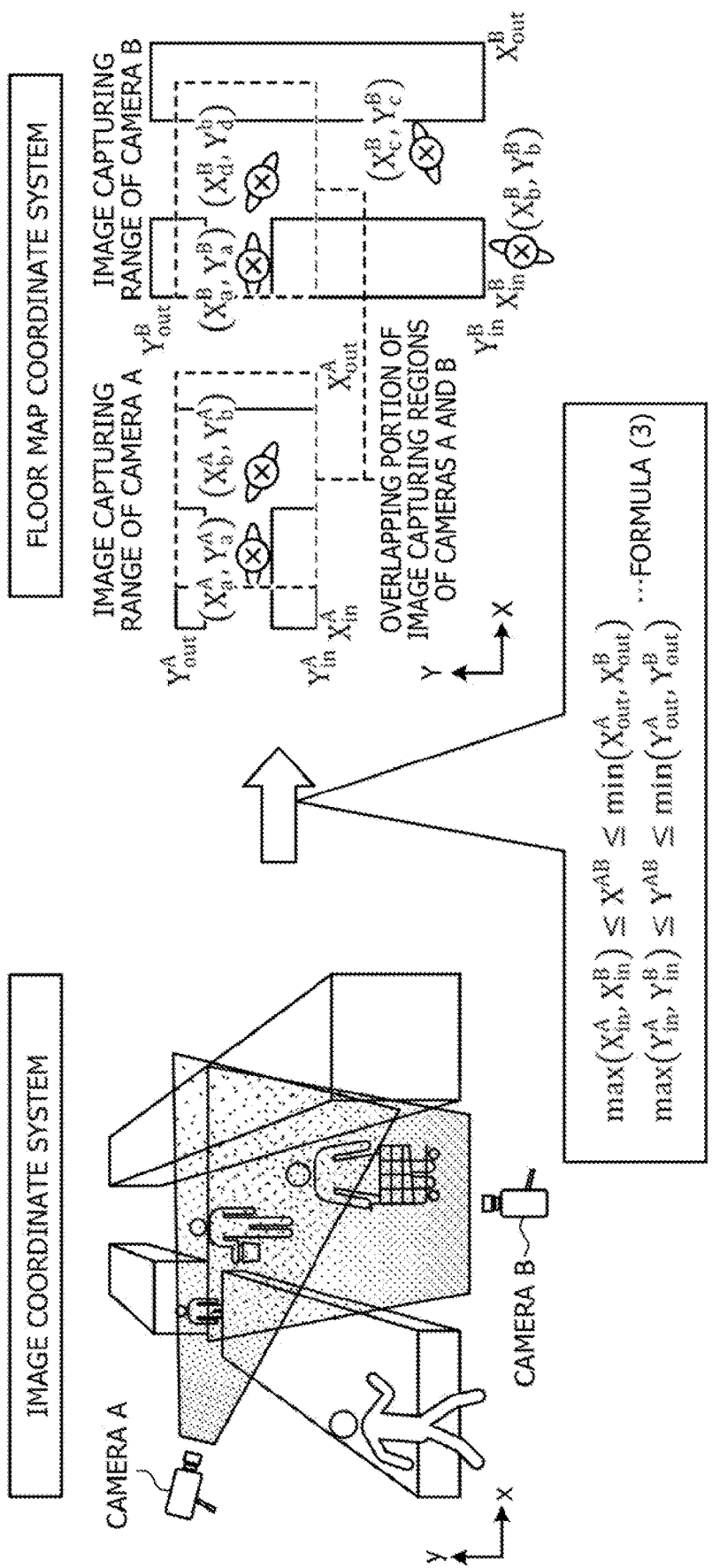
FIG. 16 is a diagram explaining extraction of a same person pair.

FIG. 16 is a diagram explaining the extraction of the same person pair. As illustrated in FIG. 16, the extraction unit 23b obtains image data A captured by a camera A at time t and image data B captured by a camera B at the same time t. The extraction unit 23b transforms each of person bounding boxes in the image coordinate system detected from the image data A of the camera A to a person bounding box in the floor map coordinate system by using the formula (2) in FIG. 15. Similarly, the extraction unit 23b transforms each of person bounding boxes in the image coordinate system detected from the image data B of the camera B into a person bounding box in the floor map coordinate system by using the formula (2) in FIG. 15.

The extraction unit 23b calculates a range of the floor map coordinates in which image capturing ranges of the respective cameras overlap each other. For example, as illustrated in FIG. 16, the image capturing range of the camera A is a range of $X^A_{in}$ to $X^A_{out}$ for the X-axis and a range of $Y^A_{in}$ to $Y^A_{out}$ for the Y-axis, and $(X^A_a, Y^A_a)$ and $(X^A_b, Y^A_b)$ are detected as the person positions within this range. The image capturing range of the camera B is a range of $X^B_{in}$ to $X^B_{out}$ for the X-axis and a range of $Y^B_{in}$ to $Y^B_{out}$ for the Y-axis, and $(X^B_a, Y^B_a)$, $(X^B_b, Y^B_b)$, $(X^B_c, Y^B_c)$, and $(X^B_d, Y^B_d)$ are detected as the person positions within this range. As described above, each person position is the image coordinates of the lower end center of the detected person bounding box.

The extraction unit 23b calculates a range $(X^{AB}, Y^{AB})$ in which the range $(X^A, Y^A)$ of the floor map coordinates of the camera A and the range $(X^B, Y^B)$ of the floor map coordinates of the camera B overlap each other. As illustrated in a formula 3 in FIG. 16, a range of $X^{AB}$ is equal to or larger than the maximum value out of "$X^A_{out}$ or $X^B_{in}$" and equal to or smaller than the minimum value out of "$X^A_{out}$ or $X^B_{out}$", and a range of $Y^{AB}$ is equal to or larger than the maximum value out of "$Y^A_{in}$ or $Y^B_{in}$" and equal to or smaller than the minimum value out of "$Y^A_{out}$ or $Y^B_{out}$".

The extraction unit 23b then extracts a pair of persons at the similar positions for person groups of the respective cameras in the overlapping range $(X^{AB}, Y^{AB})$. For example, the extraction unit 23b extracts combinations of neighboring pairs by using a method such as minimum weighted matching using Euclidean distances, and sets a neighboring pair whose Euclidean distance is smaller than a predetermined threshold among the neighboring pairs, as a same person pair. In this case, if the extraction unit 23b extracts the same person pair for every frame, the extraction unit 23b obtains many pieces of pair data that are substantially the same. Accordingly, the pair data may be thinned out by sampling.

In the example illustrated in FIG. 16, the extraction unit 23b determines that persons of a person Aa $(X^A_a, Y^A_a)$ and a person Ab $(X^A_b, Y^A_b)$ are detected in the image capturing range on the camera A side, and persons of a person Ba $(X^B_a, Y^B_a)$ and a person Bd $(X^B_d, Y^B_d)$ are detected in the image capturing range on the camera B side, in the overlapping range of the camera A and the camera B. Then, the extraction unit 23b calculates a Euclidean distance between the person Aa $(X^A_a, Y^A_a)$ and the person Ba $(X^B_a, Y^B_a)$ and a Euclidean distance between the person Aa $(X^A_a, Y^A_a)$ and the person Bd $(X^B_d, Y^B_d)$. Similarly, the extraction unit 23b calculates a Euclidean distance between the person Ab $(X^A_b, Y^A_b)$ and the person Ba $(X^B_a, Y^B_a)$ and a Euclidean distance between the person Ab $(X^A_b, Y^A_b)$ and the person Bd $(X^B_d, Y^B_d)$.

Then, the extraction unit 23b extracts each pair of the person Aa $(X^A_a, Y^A_a)$ and the person Ba (X B a, Y B a) and a pair of the person Ab $(X^A_b, Y^A_b)$ and the person Bd $(X^B_d, Y^B_d)$, as person pairs whose Euclidean distances are smaller than the predetermined threshold.

As described above, the extraction unit 23b extracts a pair to be the same person for the persons (person bounding boxes) included in the pieces of image data of the respective cameras captured at the same time. A set of N pair images of the same person is thereby obtained.

The generation unit 23c is a processing unit that generates a directed graph including nodes corresponding to person features of multiple samples included in the pair images of the same person.

Figure 17:
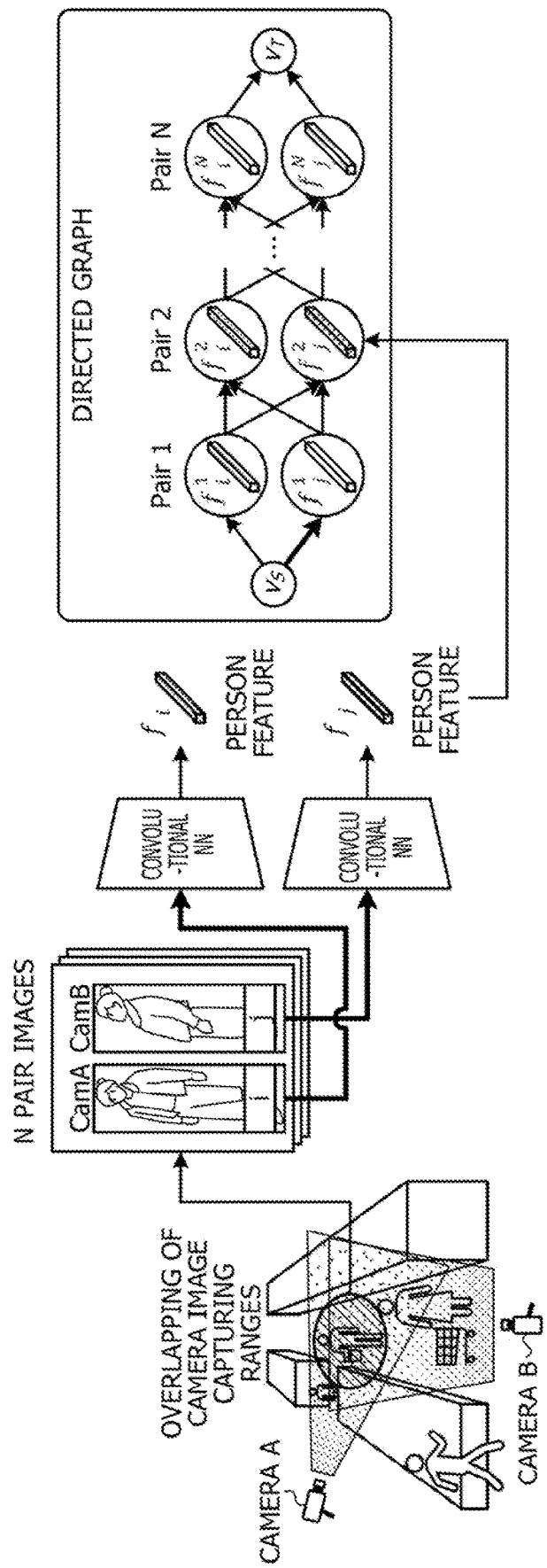
FIG. 17 is a diagram explaining generation of a directed graph.

FIG. 17 is a diagram explaining the generation of the directed graph. As illustrated in FIG. 17, first, the generation unit 23c inputs each of the samples included in each of the N pair images, into the convolutional neural network to which the input layer and the intermediate layer of the trained first machine learning model are transferred. The person feature of each of the 2N samples included in the dataset of the N pair images is thereby obtained.

Two nodes are provided to correspond to the person features of the two samples included in each of the N pair images of the same person, and the generation unit 23c arranges the nodes in order in the direction from the starting point to the terminal point. In this case, child nodes of the respective two nodes of a certain pair image are set to be two nodes of another pair image, and the two parent nodes and the two child nodes are coupled to one another, respectively, by links.

For example, a node corresponding to a person feature $f^1_i$ and a node corresponding to a person feature $F^1_j$ of the first pair are arranged subsequent to a starting point node vs of the directed graph. Subsequent to these nodes, a node corresponding to a person feature $f^2_i$ and a node corresponding to a person feature $f^2_j$ of the second pair, . . . , and a node corresponding to a person feature $f^N_i$ and a node corresponding to a person feature $f^j_N$ of the N-th pair are arranged in order. A terminal point node $v_T$ is arranged subsequent to the nodes of the N-th pair.

In such a directed graph, the child nodes of the respective two nodes of a certain pair image are set to be two nodes of another pair image, and the two parent nodes and the two child nodes are coupled to one another, respectively, by links.

For example, giving description by using the links between the first pair and the second pair as an example, the following four links are defined. For example, there are defined a link coupling the person feature $f^1_i$ and the person feature $f^2_i$, a link coupling the person feature $f^1_i$ and the person feature $f^2_j$, a link coupling the person feature $f^1_j$ and the person feature $f^2_i$, and a link coupling the person feature $f^1_j$ and the person feature $f^2_j$.

The directed graph defined as described above means a path extending from a starting point to a terminal point while adopting one of the samples in each pair image.

The calculation unit 23d is a processing unit that calculates weights of the links included in the directed graph. For example, for each of the links included in the directed graph, the calculation unit 23d calculates the number of similar samples reflecting the selection result of the person feature in the immediately-preceding node, and sets the value of this number as the weight of the link.

FIG. 18 is a diagram explaining the calculation of the weights of the links. FIG. 18 illustrates the number of similar samples in a link illustrated by a bold solid line and the number of similar samples in a link illustrated by a bold broken line.

For example, in the case of the link illustrated by the bold solid line, there is calculated the number of similar samples between the person feature of the sample of i=2 that is the immediately-subsequent node coupled to the terminal point side of the link and the person features of the nodes included in the path up to the immediately-preceding node coupled to the starting point side of the link, for example, the samples of i=1, i=3, and i=4. In this case, the distance between the person feature of the sample of i=2 and the person feature of the samples of i=3 and i=4 is equal to or smaller than the threshold Th1. Accordingly, the number of similar samples is calculated as "2". The number of similar samples "2" calculated as described above is set as the weight of the link illustrated by the bold solid line.

In the case of the link illustrated by the bold broken line, there is calculated the number of similar samples between the person feature of the sample of i=5 that is the immediately-subsequent node coupled to the terminal point side of the link and the person features of the nodes included in the path up to the immediately-preceding node coupled to the starting point side of the link, for example, the samples of i=1, i=3, and i=4. In this case, there is no person feature whose distance to the person feature of the sample of i=5 is equal to or smaller than the threshold Th1. Accordingly, the number of similar samples is calculated as "0". The number of similar samples "0" calculated as described above is set as the weight of the link illustrated by the bold broken line.

In FIG. 18, the person features of the samples of i=1, i=3, and i=4 common to the two links are extracted and given as examples of the nodes included in the path up to the immediately-preceding node. However, each of the nodes in the immediately-preceding pair may include person features that vary from the other node.

The determination unit 23e is a processing unit that determines the combination pattern of the person features in which the total number of similar samples is maximized in the pair images of the same person as a whole. For example, the determination unit 23e formulates the combinatorial optimization problem that determines the combination pattern of the nodes, for example, the combination pattern of the person features in which the sum of the weights of the links on the directed graph is maximized, according to the Dijkstra method.

Figure 19:
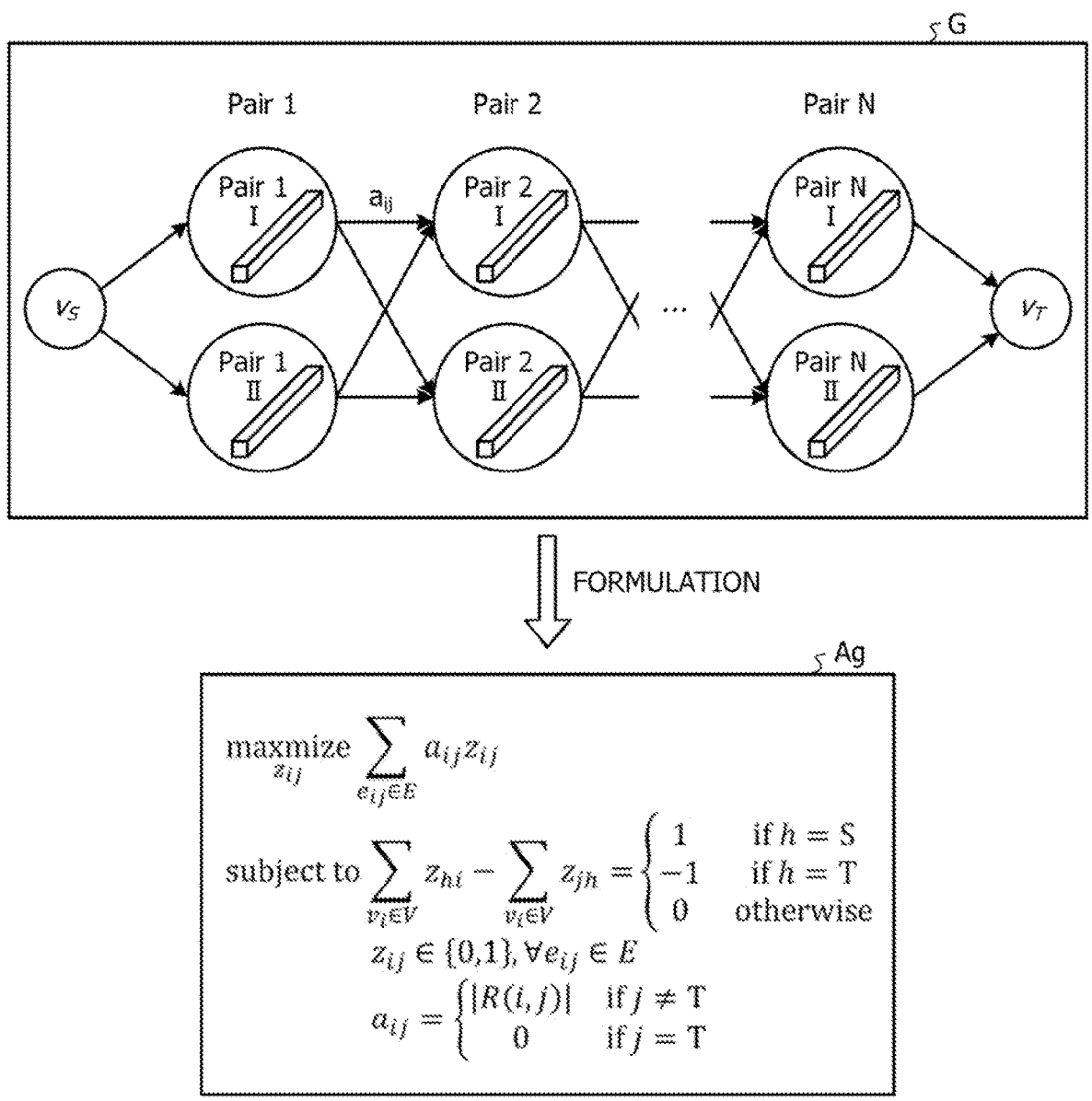
FIG. 19 is a diagram explaining formulation of a combinatorial optimization problem.

FIG. 19 is a diagram explaining the formulation of the combinatorial optimization problem. For example, elements relating to a directed graph G=(V, E) illustrated in FIG. 19 are expressed as follows. For example, an edge is expressed as $e_{ij}=(v_i, v_j) \in E$, a node is expressed as $v_i \in V$, a weight of the edge $e_{ij}$ is expressed as $a_{ij}$, and the number of similar samples is expressed as |R(i, J)|. The node vi corresponds to a person feature of a sample i. The number of similar samples |R(i, J)| corresponds to the number of similar samples of a node j taking a person feature of the immediately-preceding node i into consideration.

An optimization problem for searching for the path in which the total number of similar samples is maximized in paths z from a starting point node $v_S$ to a terminal point node $v_T$ of the directed graph G illustrated in FIG. 19 may be formulated into an algorithm Ag according to the Dijkstra method. The algorithm Ag means a combinatorial optimization problem for obtaining an optimum combination among combinations of the weight sums of the possible paths z in the directed graph G. When the Dijkstra method is applied as described above, the calculation amount for determining the combination pattern of the person features may be reduced to $N^2$.

The determination unit 23e executes the calculation of the optimization problem formulated into the algorithm Ag as described above, and thereby determines the combination pattern of the person features in which the total number of similar samples is maximized in the N pair images as a whole.

Figure 20:
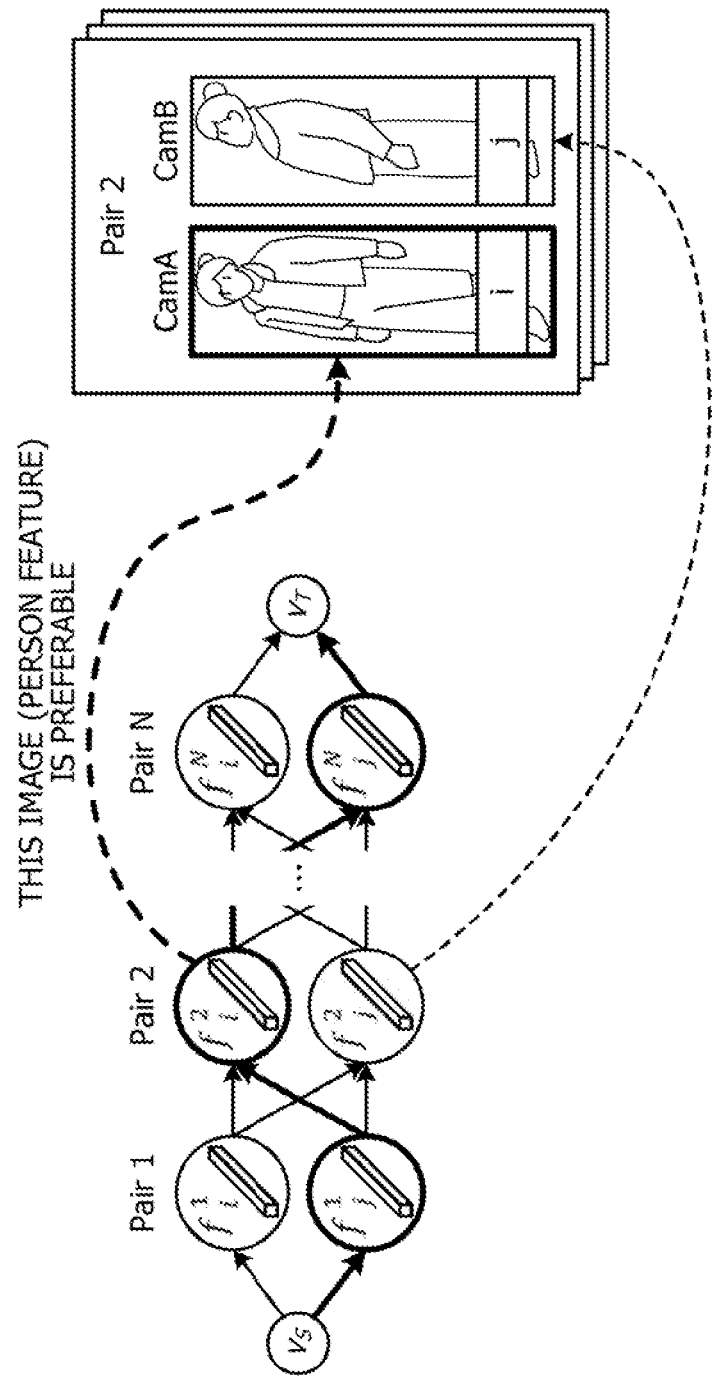
FIG. 20 is a diagram explaining determination of a combination pattern of the person features.

FIG. 20 is a diagram explaining the determination of the combination pattern of the person features. As illustrated in FIG. 20, executing the calculation of the optimization problem formulated into the algorithm Ag illustrated in FIG. 19 determines that a path in which links illustrated by bold lines continue is the combination pattern of the person features in which the total number of similar samples is maximized in the N pair images as a whole. According to the combination pattern of the person features determined as described above, the person features to be used for the correction may be successfully selected. For example, using the path obtained by the calculation of the optimization problem allows a person feature j to be selected out of a person feature i and the person feature j included in the second pair image, the person feature j being a person feature by which the incorporation into the same pseudo label is promoted.

After the determination of the combination pattern of the person features as described above, the training data generation unit 23 executes the correction in which the person features of the two samples in each of the N pair images of the same person are unified into one of the person features of the two samples, the one person feature corresponding to the combination pattern of the person features determined by the determination unit 23e. Such correction replaces the person feature not selected in the combination pattern of the person features with the person feature selected in the combination pattern of the person features, for each of the N pair images of the same person.

Then, as illustrated in FIG. 10, the training data generation unit 23 calculates the person feature distance between the samples by using the person features corrected for the respective combinations of 2N samples, and thereby calculates the distance matrix M1. The training data generation unit 23 clusters the 2N samples included in the dataset of the N pair images based on the distance matrix M1, and generates a pseudo label for each of clusters obtained as a result of the clustering. Then, the training data generation unit 23 generates training data in which the person features of the 2N samples included in the dataset of the N pair images are explanatory variables and the pseudo labels are objective variables, and stores the training data in the store dataset 15.

Returning to FIG. 11, the identification model generation unit 24 includes a first machine learning unit 24a and a second machine learning unit 24b, and is a processing unit that executes the machine learning of the person identification model 17.

The first machine learning unit 24a executes machine learning by a multiclass classification problem using the public dataset 14, and generates a first machine learning model. As described by using FIG. 10, the first machine learning unit 24a generates the first machine learning model by performing machine learning of the multiclass classification problem in which, in response to input of pieces of training data capturing the same person, respectively, in different ways, the person captured in each piece of inputted training data is identified. The first machine learning model may include an output layer and a convolutional neural network including an input layer and an intermediate layer.

For example, the first machine learning unit 24a inputs various person bounding boxes of a person A included in the public dataset 14 into the convolutional neural network, and obtains each of identification results (output results) from the output layer. The first machine learning unit 24a updates the parameters of the convolutional neural network and the output layer such that an error between each identification result and the person label (person A) decreases, for example, such that the person in the person bounding box is identified as the person A.

Similarly, the first machine learning unit 24a inputs various person bounding boxes of a person B included in the public dataset 14 into the convolutional neural network, and obtains each of identification results from the output layer. The first machine learning unit 24a updates the parameters of the convolutional neural network and the output layer such that an error between each identification result and the person label (person B) decreases.

After the completion of the machine learning using the public dataset, the second machine learning unit 24b executes machine learning using the store dataset 15 to generate the person identification model 17 that is an example of the third machine learning model.

For example, the second machine learning unit 24b sets parameters of a layer structure of the person identification model 17 by using a new, untrained output layer and a convolutional neural network including the input layer and the intermediate layer of the trained first machine learning model. The second machine learning unit 24b generates the person identification model 17 by performing machine learning in which class classification of pseudo labels is performed on person bounding box images by using training data stored in the store dataset 15.

For example, as illustrated in FIG. 10, the second machine learning unit 24b trains the third machine learning model including the new output layer and the convolution NN to which the input layer and the intermediate layer of the trained first machine learning model are transferred with the person features of the 2N samples being explanatory variables and the pseudo labels being objective variables.

For example, a person feature of a sample is inputted into the third machine learning model to obtain an output result including a label of a class corresponding to a category of the pseudo label, and training of the third machine learning model is executed such that the output result coincides with a correct pseudo label. For example, parameters of the third machine learning model are updated by optimizing an objective function based on the output result of the third machine learning model and the correct pseudo label. For example, the parameters of the third machine learning model may be updated based on a loss function that minimizes a loss and that is obtained from the output result and the correct pseudo label.

Returning to FIG. 11, the inference execution unit 25 is a processing unit that uses the person identification model 17 generated by the identification model generation unit 24 to execute identification of a person captured in each of the pieces of image data captured by the cameras 2 in the actual store. For example, the inference execution unit 25 uses the person identification model 17 to execute association of a person in the image data captured by each camera 2.

Figure 21:
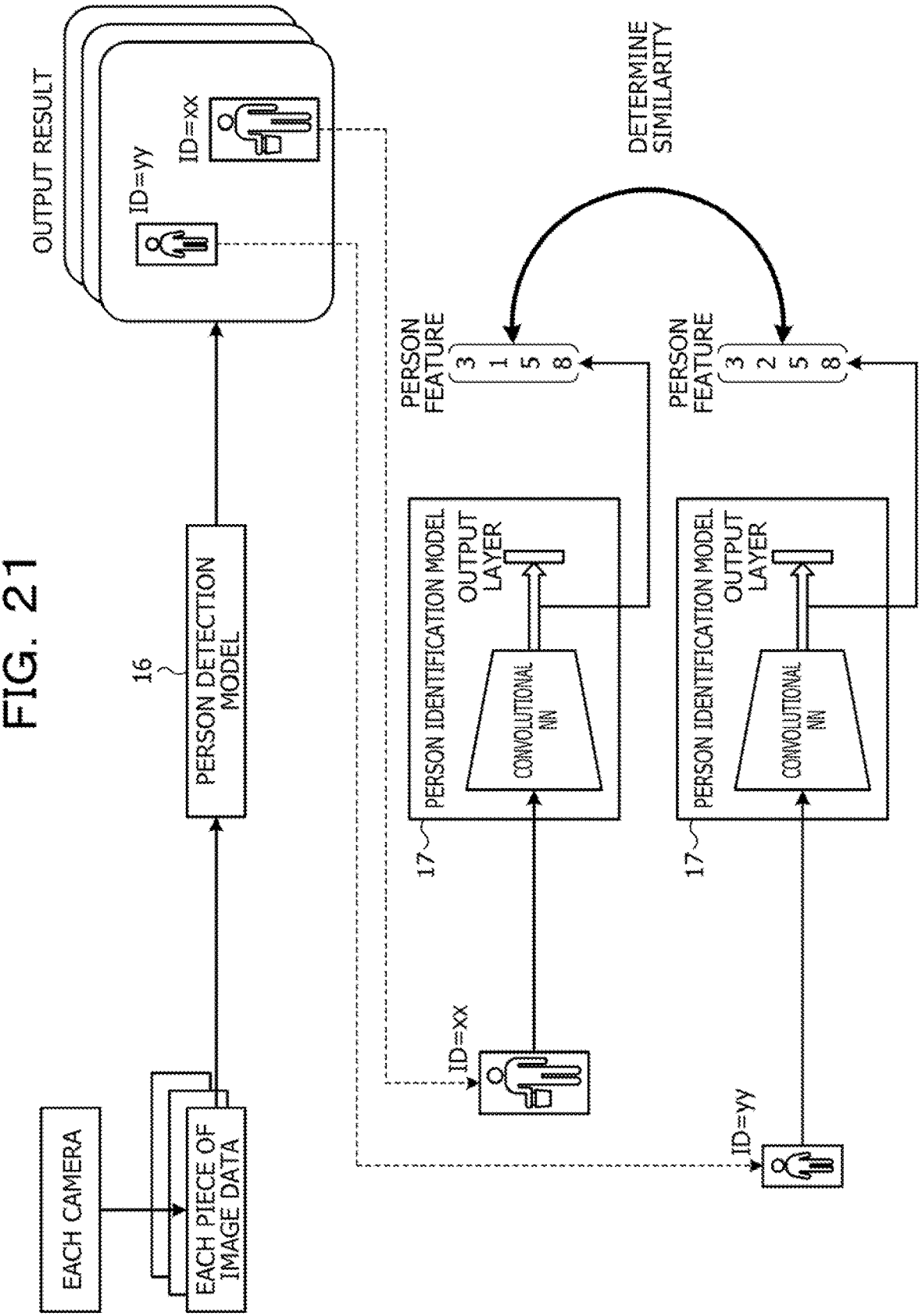
FIG. 21 is a diagram explaining inference processing.

FIG. 21 is a diagram explaining the inference processing. As illustrated in FIG. 21, the inference execution unit 25 inputs each of the pieces of image data captured by each of the cameras 2 in the store into the trained person detection model 16, and obtains an output result including a detected person bounding box. For example, the inference execution unit 25 obtains a person bounding box of "ID=xx" and a person bounding box of "ID=yy" included in different output results.

The inference execution unit 25 inputs the person bounding box of "ID=)(x" into the person identification model 17, and obtains the person feature from a layer immediately preceding the output layer of the person identification model 17. Similarly, the inference execution unit 25 inputs the person bounding box of "ID=yy" into the person identification model 17, and obtains the person feature from the layer immediately preceding the output layer of the person identification model 17.

Then, the inference execution unit 25 calculates the similarity between each two features. When the similarity is high, the inference execution unit 25 infers that the person bounding box of "ID=)(x" and the person bounding box of "ID=yy" are the same person. Meanwhile, when the similarity between each two features is low, the inference execution unit 25 infers that the person bounding box of "ID=xx" and the person bounding box of "ID=yy" are not the same person.

For example, the inference execution unit 25 calculates the Euclidean distance and cosine similarity between each two features, a square error of elements of the respective features, or the like, as the similarity between each two features. When the calculated similarity is equal to or larger than a threshold, the inference execution unit 25 infers that the person bounding boxes are the same person.

Tracking each of the person bounding boxes inferred as the same person as described above allows data to be used for behavior analysis of this person in the store and analysis of merchandise purchased by this person.

[Flow of Processing]

Processing performed by each of the processing units described above is described next. The preliminary processing, the processing of extracting the same person pair, the training data generation processing, the machine learning processing, and the inference processing are described.

(Preliminary Processing)

Figure 22:
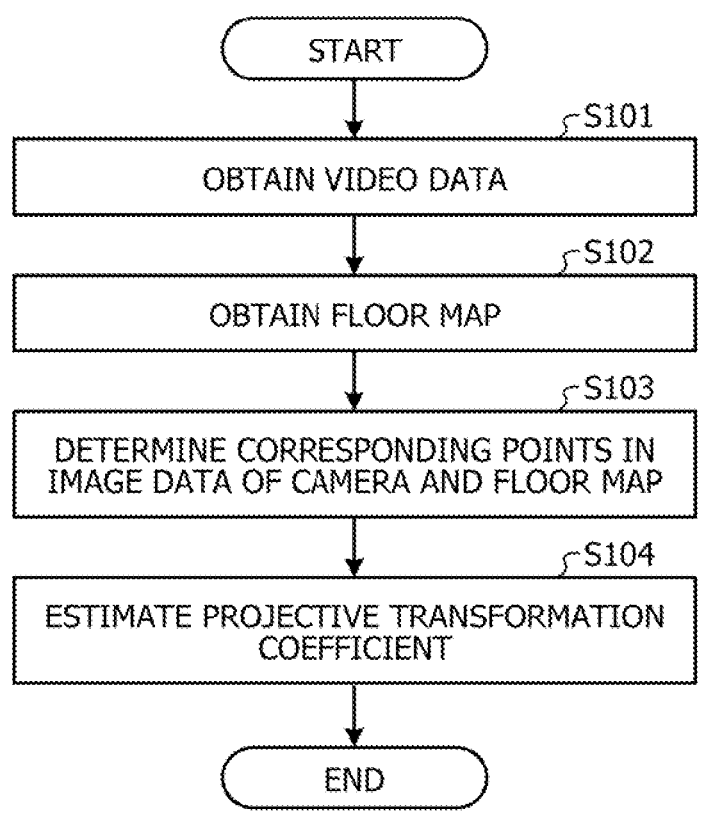
FIG. 22 is a flowchart illustrating a flow of preliminary processing.

FIG. 22 is a flowchart illustrating a flow of the preliminary processing. As illustrated in FIG. 22, the preliminary processing unit 22 obtains the video data of each camera 2 (S101), and obtains the floor map of the store designed in advance (S102).

The preliminary processing unit 22 determines the corresponding points that are arbitrarily corresponding points in the image data of the camera 2 and the floor map (S103), and estimates the projective transformation coefficient by using the formula (1) in FIG. 13 (S104).

(Processing of Extracting Same Person Pair)

Figure 23:
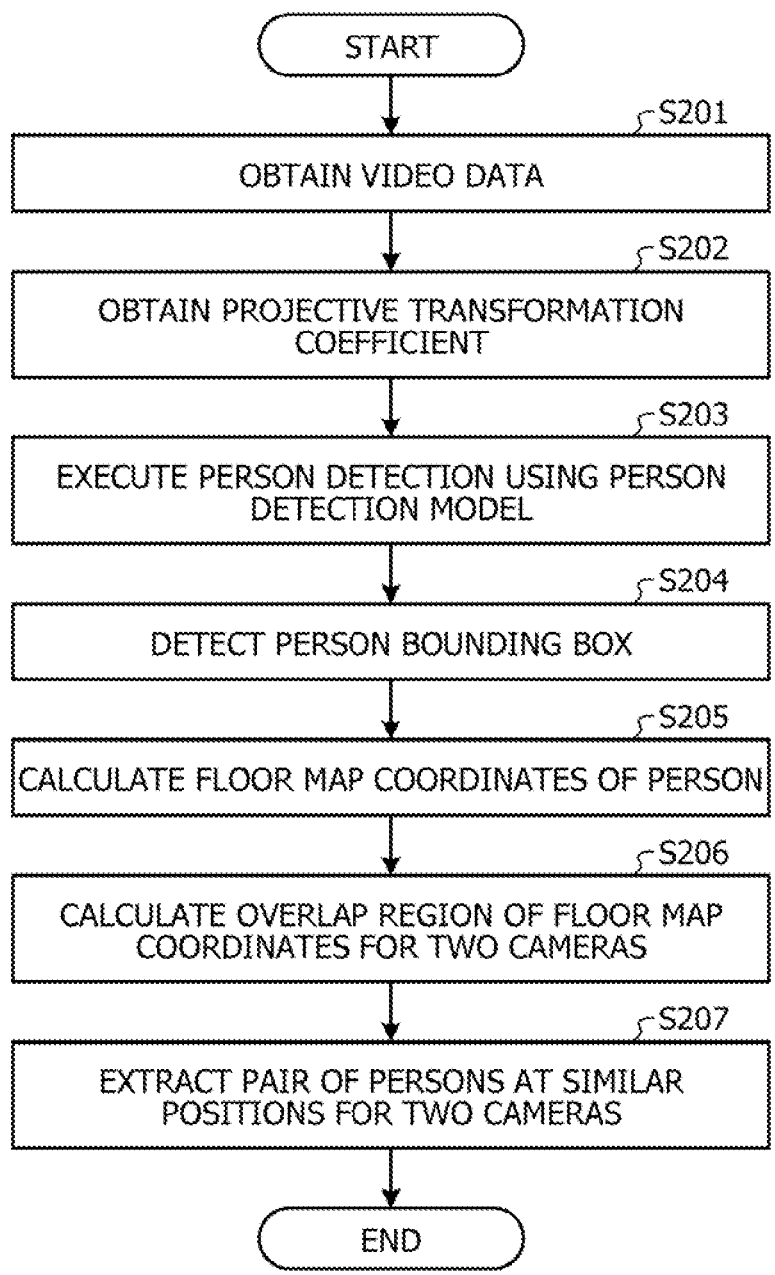
FIG. 23 is a flowchart illustrating a flow of processing of extracting the same person pair.

FIG. 23 is a flowchart illustrating a flow of the processing of extracting the same person pair. As illustrated in FIG. 23, the training data generation unit 23 obtains the video data of each camera 2 from the video data DB 13 (S201), and obtains the projective transformation coefficient estimated by the preliminary processing unit 22 (S202).

Then, the training data generation unit 23 executes person detection by inputting each of pieces of image data in the video data of each of the cameras 2 into the person detection model 16 (S203), and detects the person bounding boxes (S204).

The training data generation unit 23 calculates the floor map coordinates of the person bounding box of each person by using the projective transformation coefficient (S205).

For example, the training data generation unit 23 transforms the image coordinate system of the person bounding box of each person into the floor map coordinates.

Then, the training data generation unit 23 calculates the overlapping region of the floor map coordinate system for the pieces of image data of the two cameras (S206). The training data generation unit 23 extracts a pair of persons at similar positions in the pieces of image data captured at the same time by the two cameras (S207).

(Training Data Generation Processing)

Figure 24:
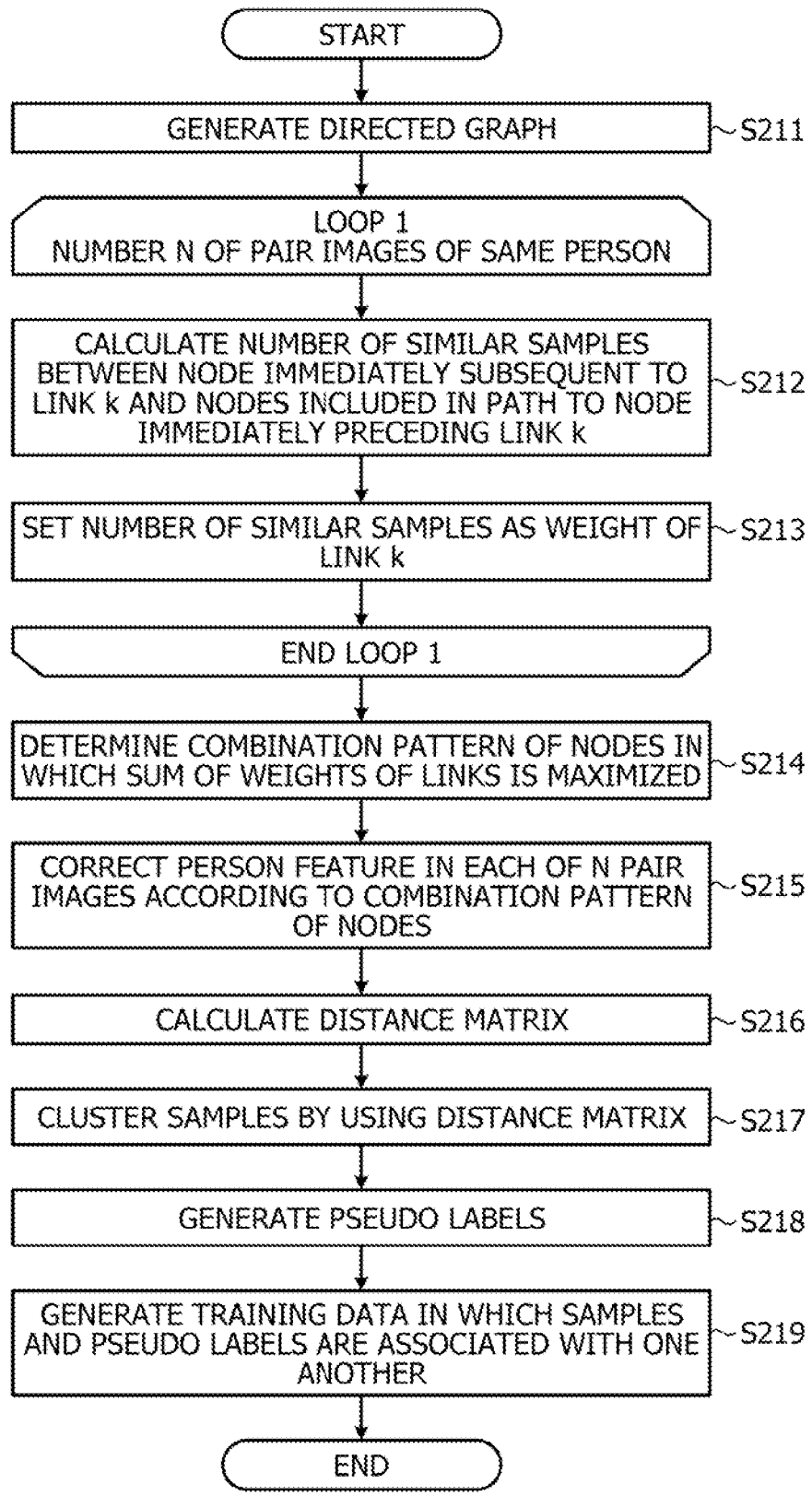
FIG. 24 is a flowchart illustrating a flow of training data generation processing.

FIG. 24 is a flowchart illustrating a flow of the training data generation processing. As illustrated in FIG. 24, the training data generation unit 23 generates the directed graph G in which two nodes are provided to correspond to the person features of the two samples included in each of the pair images of the same person, and the nodes are arranged in order in the direction from the starting point to the terminal point (S211).

In the above-described step S211, the child nodes of the respective two nodes of a certain pair image are set to be two nodes of another pair image, and links coupling the two parent nodes and the two child nodes to one another, respectively, are set in the directed graph G.

The training data generation unit 23 executes loop process 1 in which processing from step S212 described below to step S213 described below is repeated as many times as the number K of links included in the directed graph G generated in step S211.

For example, the training data generation unit 23 calculates the number of similar samples between a node immediately subsequent to a link k and nodes included in a path to a node immediately preceding the link k (S212). Then, the training data generation unit 23 sets the number of similar samples calculated in step S212 as the weight of the link k (S213).

The weight of the link is calculated for each of the K links included in the directed graph G by repeating the loop process 1 as described above.

The training data generation unit 23 calculates the optimization problem for obtaining the optimum combination from among the combinations of weight sums of possible paths z in the directed graph G, and thereby determines the combination pattern of nodes, for example, the combination pattern of the person features in which the total number of similar samples is maximized in the N pair images as a whole (S214).

Then, the training data generation unit 23 executes the correction in which the person features of the two samples in each of the N pair images of the same person are unified into one of the person features of the two samples, the one person feature corresponding to the combination pattern of the person features determined in step S214 (S215).

Then, the training data generation unit 23 calculates the person feature distance between the samples by using the person features corrected for the respective combinations of 2N samples, and thereby calculates the distance matrix (S216).

The training data generation unit 23 clusters the 2N samples included in the dataset of the N pair images based on the distance matrix, and generates the pseudo label for each of clusters obtained as a result of the clustering (S217 and S218).

Then, the training data generation unit 23 generates training data in which the person features of the 2N samples included in the dataset of the N pair images are explanatory variables and the pseudo labels are objective variables, and stores the training data in the store dataset 15 (S219).

(Machine Learning Processing)

Figure 25:
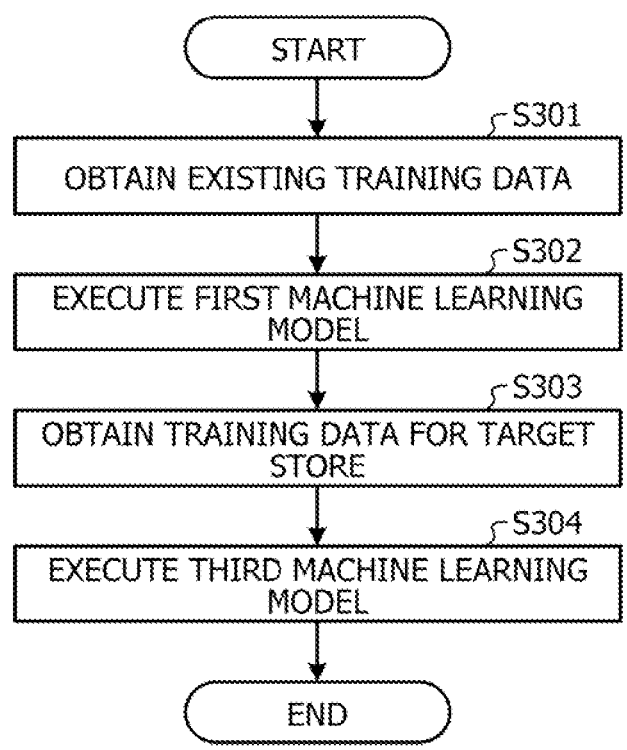
FIG. 25 is a flowchart illustrating a flow of machine learning processing of the person identification model.

FIG. 25 is a flowchart illustrating a flow of the machine learning processing of the person identification model. As illustrated in FIG. 25, the identification model generation unit 24 obtains existing training data stored in advance in the public dataset 14 (S301), and executes the machine learning of the first machine learning model as the multiclass classification problem, by using the existing training data (S302).

Then, the identification model generation unit 24 obtains training data for the target store generated by using the image data of the store stored in the store dataset 15 (S303), and executes the machine learning of the person identification model 17 by using the training data for the target store (S304).

(Inference Processing)

Figure 26:
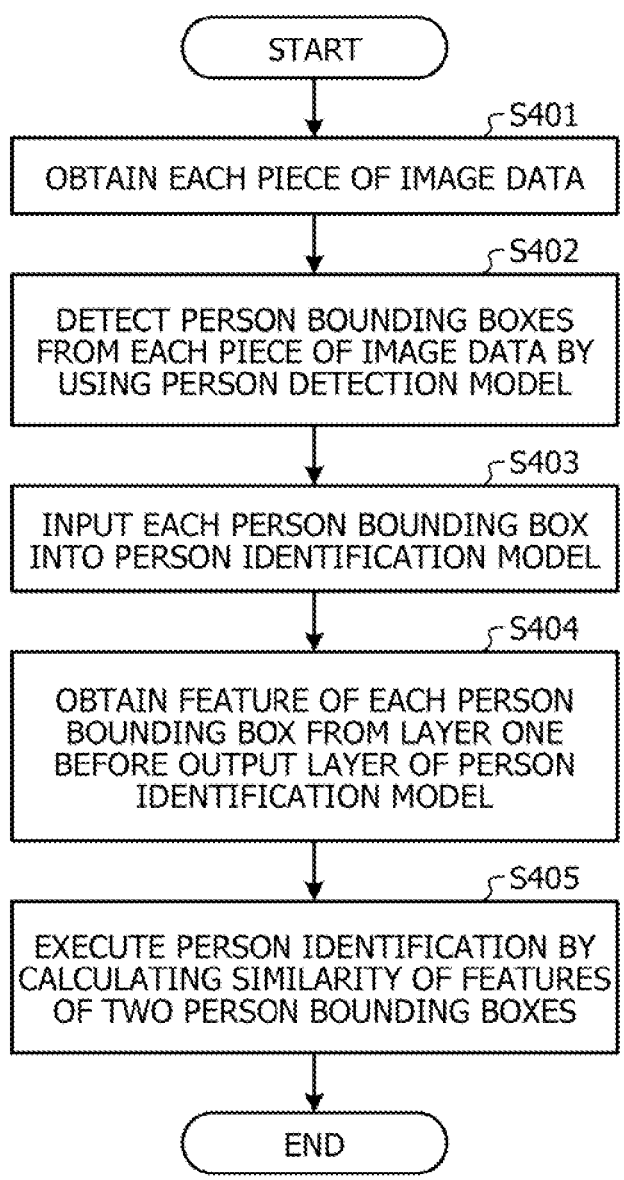
FIG. 26 is a flowchart illustrating a flow of the inference processing.

FIG. 26 is a flowchart illustrating a flow of the inference processing. As illustrated in FIG. 26, the inference execution unit 25 obtains each of the pieces of image data of each of the cameras 2 (S401), inputs each piece of image data into the person detection model 16, and detects the person bounding box (S402).

The inference execution unit 25 inputs two person bounding boxes into the person identification model 17 (S403), and obtains the features of the respective person bounding boxes from a layer immediately preceding (one before) the output layer of the person identification model 17 (S404). Then, the inference execution unit 25 calculates the similarity of the features of the respective person bounding boxes, and executes person identification (S405).

Effects

As described above, the information processing apparatus 10 focuses on the characteristic of the number of similar samples when selecting the person feature representing two samples in the pair image of the same person, and determines the combination pattern of the person features in which the total number of similar samples is maximized in the N pair images as a whole, the similar samples being samples in which the person feature distance between the samples is equal to or less than the threshold. The person identification model 17 is generated based on the training data in which the pseudo labels are assigned to the samples, the pseudo label successfully generated according to the combination pattern of the person features determined as described above. Accordingly, causing the information processing apparatus 10 to execute the person identification by using the person identification model 17 generated as described above may suppress a decrease in the accuracy of the pseudo labels, improve the person tracking accuracy, and achieve the purchase behavior analysis with high accuracy. Since the training data for person identification in the inference target store may be obtained, automatic obtaining of analysis target training data is possible, and the accuracy of person identification may be continuously improved.

FIG. 27 is a diagram explaining effects according to the embodiment 1. FIG. 27 illustrates comparison of inference accuracy of person identification in the reference technique 3 and that in the technique according to the embodiment 1 (proposed technique). A dataset A, a dataset B, and a dataset C varying in person image characteristics (season, background, and the like) are illustrated in FIG. 27. The inference accuracy of person identification in the reference technique 3 and that in the proposed technique according to the embodiment 1 are compared in total of four patterns that are a pattern P1 in which the training is performed with the dataset A and the inference is performed with the dataset B, a pattern P2 in which the training is performed with the dataset B and the inference is performed with the dataset A, a pattern P3 in which the training is performed with the dataset B and the inference is performed with the dataset C, and a pattern P4 in which the training is performed with the dataset A and the inference is performed with the dataset C.

As illustrated in FIG. 27, comparison is performed by using inference accuracy based on a cumulative matching characteristic that is a ratio of pieces of person data identified as the same person in a certain rank or higher among many pieces of person data. For example, in the case of the reference technique 3, in the correction of the person feature in which the person features are unified between the samples in the pair image, there is a case where the person feature is corrected to the person feature of the unsuitable sample out of the two samples. Accordingly, sufficient inference accuracy is not obtained. Meanwhile, in the method according to the embodiment 1, the person feature of the suitable sample may be used in the correction of the person feature in which the person features are unified between the samples in the pair image. Accordingly, the inference accuracy is improved. For example, in comparison of the top matching ratios, in the pattern P1, the inference accuracy in the reference technique 3 is "93.2" while the inference accuracy in the embodiment 1 is improved to "94.0". In the pattern P2, the inference accuracy in the reference technique 3 is "81.9" while the inference accuracy in the embodiment 1 is improved to "82.3". In the pattern P3, the inference accuracy in the reference technique 3 is "60.6" while the inference accuracy in the embodiment 1 is improved to "65.1". In the pattern P4, the inference accuracy in the reference technique 3 is "64.0" while the inference accuracy in the embodiment 1 is improved to "66.9". As described above, since the inference accuracy in the embodiment 1 is superior to the inference accuracy in the reference technique 3 in all of the four patterns P1 to P4, it is apparent that the inference accuracy has improved in the embodiment 1.

As described above, the information processing apparatus 10 performs training with the person features suitable for the inference target store, and it is possible to improve the person tracking accuracy and achieve the purchase behavior analysis with high accuracy. The information processing apparatus 10 may track a shopping behavior, a suspicious behavior, and the like by accurately identifying a person from the multiple monitoring cameras in the store. The information processing apparatus 10 may obtain the person identification data of the inference target store from information on overlapping of image capturing regions of multiple cameras, and perform training with the person identification data.

Embodiment 2

Although the embodiment of the present disclosure have been described above, the present disclosure may be carried out in various forms other than the above-described embodiment.

[Numerical Values and Like]

The number of cameras, the numerical value examples, the training data examples, the machine learning models, the coordinate examples, and the like used in the above-described embodiment are merely examples, and may be arbitrarily changed. The flow of processing described in each flowchart may also be changed as appropriate within the scope without contradiction. A model generated by various algorithms such as a neural network may be adopted as each model. In the above-described embodiment, there is described the example in which the second machine learning unit 24b uses the new, untrained output layer and the convolutional neural network including the input layer and the intermediate layer of the trained first machine learning model to form the person identification model 17. However, the present disclosure is not limited to this, and the person identification model 17 may be formed by using some of the layers of the first machine learning model. In this case, it is preferable to exclude the output layer of the first machine learning model. In the coordinate transformation, the transformation may be performed in units of piece of image data or in units of person bounding boxes.

[System]

The processing procedure, the control procedure, the specific names, and the information including various pieces of data and parameters that are described above in the document and the drawings may be arbitrarily changed unless otherwise noted.

The specific form of distribution or integration of components in each apparatus is not limited to that illustrated in the drawings. For example, the preliminary processing unit 22 and the training data generation unit 23 may be integrated. For example, all or part of the components may be functionally or physically distributed or integrated in arbitrary units depending on various types of loads, usage states, or the like. All or arbitrary part of the processing functions of each apparatus may be implemented by a CPU and a program analyzed and executed by the CPU or may be implemented by hardware using wired logic.

[Hardware]

Figure 28:
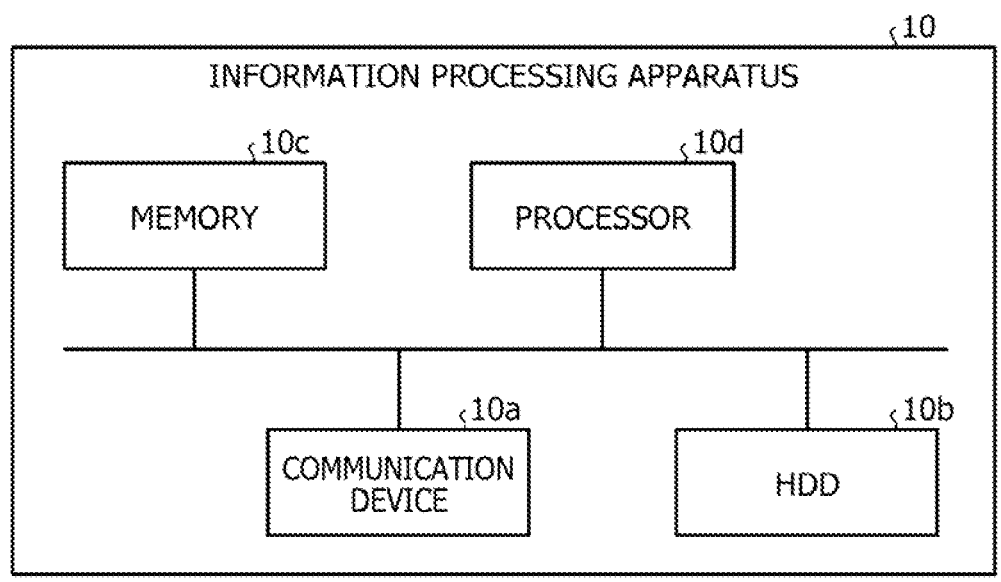
FIG. 28 is a diagram explaining a hardware configuration example.

FIG. 28 is a diagram explaining a hardware configuration example. As illustrated in FIG. 28, the information processing apparatus 10 includes a communication device 10a, a hard disk drive (HDD) 10b, a memory 10c, and a processor 10d. The units illustrated in FIG. 28 are coupled to one another by a bus or the like.

The communication device 10a is a network interface card or the like and communicates with other apparatuses. The HDD 10b stores a DB and a program that runs the functions illustrated in FIG. 11.

The processor 10d reads a program that executes processing similar to that performed by each of the processing units illustrated in FIG. 11 from the HDD 10b or the like, and loads the read program on the memory 10c to run processes of executing the respective functions described in FIG. 11 and the like. For example, in these processes, functions similar to those of the respective processing units included in the information processing apparatus 10 are executed. For example, the processor 10d reads out a program having functions similar to those of the detection model generation unit 21, the preliminary processing unit 22, the training data generation unit 23, the identification model generation unit 24, the inference execution unit 25, and the like, from the HDD or the like. The processor 10d executes processes that execute processing similar to those of the detection model generation unit 21, the preliminary processing unit 22, the training data generation unit 23, the identification model generation unit 24, the inference execution unit 25, and the like.

As described above, the information processing apparatus 10 operates as an information processing apparatus that executes an information processing method by reading and executing the program. The information processing apparatus 10 may also implement functions similar to those of the above-described embodiment by reading the above-described program from a recording medium with a medium reading device and executing the above-described read programs. The program described in this other embodiment is not limited to being executed by the information processing apparatus 10. For example, the above-described embodiment may be similarly applied to the case where another computer or a server executes the program and the case where the computer and the server cooperate with each other to execute the program.

The program may be distributed via a network such as the Internet. The program may be recorded in a computer-readable recording medium such as a hard disk, a flexible disk (FD), a compact disc read-only memory (CD-ROM), a magneto-optical (MO) disk, or a Digital Versatile Disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a determination program that causes at least one computer to execute a process, the process comprising:
   obtaining a plurality of pair images of a person obtained from a overlapping region of images captured by each of a plurality of cameras;
   generating a directed graph including nodes corresponding to person features obtained from each of a plurality of person images included in the plurality of obtained pair images;
   acquiring weights of links between the nodes in the generated directed graph based on a number of person images with similar person features between the nodes; and
   determining a combination of the person features in which a number of the person images with the similar person features in the plurality of pair images is maximized based on the acquired weights of the links.

2. The non-transitory computer-readable storage medium according to claim 1, wherein the generated directed graph includes:
   two nodes corresponding to each of person features of two person images included in each of the plurality of pair images, arranged in order in a direction from a starting point to a terminal point, and
   two parent nodes of a first pair image among the plurality of pair images and two child nodes of a second pair image among the plurality of pair images, coupled to one another by the links.

3. The non-transitory computer-readable storage medium according to claim 1, wherein the determining includes
   determining a combination of the nodes in which a sum of the weights of the links in a path from a starting point to a terminal point of the directed graph is maximized by searching for the combination of the person features in which the total number of the person images with the similar person features is maximized in the plurality of pair images according to a Dijkstra method.

4. The non-transitory computer-readable storage medium according to claim 1, wherein the process further comprising:
  correcting, for each of the plurality of pair images, one of the person features of the two person images that is not included in the combination, to the person feature that is included in the combination;
  acquiring a distance matrix by acquiring, for each of combinations of the person images, a person feature distance between the person images by using the corrected person features;
  clustering the person images included in a dataset of the plurality of pair images based on the calculated distance matrix;
  generating a pseudo label for each of clusters obtained as a result of the clustering; and
  generating, as training data used for machine learning of a machine learning model that classifies the person images into classes of the pseudo labels, the training data in which the person images included in the dataset of the plurality of pair images are explanatory variables and the pseudo labels that are correct are response variables.

5. A determination method for a computer to execute a process comprising:
  obtaining a plurality of pair images of a person obtained from a overlapping region of images captured by each of a plurality of cameras;
  generating a directed graph including nodes corresponding to person features obtained from each of a plurality of person images included in the plurality of obtained pair images;
  acquiring weights of links between the nodes in the generated directed graph based on a number of person images with similar person features between the nodes; and
  determining a combination of the person features in which a number of the person images with the similar person features in the plurality of pair images is maximized based on the acquired weights of the links.

6. The determination method according to claim 5, wherein the generated directed graph includes:
  two nodes corresponding to each of person features of two person images included in each of the plurality of pair images, arranged in order in a direction from a starting point to a terminal point, and
  two parent nodes of a first pair image among the plurality of pair images and two child nodes of a second pair image among the plurality of pair images, coupled to one another by the links.

7. The determination method according to claim 5, wherein the determining includes
  determining a combination of the nodes in which a sum of the weights of the links in a path from a starting point to a terminal point of the directed graph is maximized by searching for the combination of the person features in which the total number of the person images with the similar person features is maximized in the plurality of pair images according to a Dijkstra method.

8. The determination method according to claim 5, wherein the process further comprising:
  correcting, for each of the plurality of pair images, one of the person features of the two person images that is not included in the combination, to the person feature that is included in the combination;
  acquiring a distance matrix by acquiring, for each of combinations of the person images, a person feature distance between the person images by using the corrected person features;
  clustering the person images included in a dataset of the plurality of pair images based on the calculated distance matrix;
  generating a pseudo label for each of clusters obtained as a result of the clustering; and
  generating, as training data used for machine learning of a machine learning model that classifies the person images into classes of the pseudo labels, the training data in which the person images included in the dataset of the plurality of pair images are explanatory variables and the pseudo labels that are correct are response variables.

9. An information processing apparatus comprising:
  one or more memories; and
  one or more processors coupled to the one or more memories and the one or more processors configured to:
  obtain a plurality of pair images of a person obtained from a overlapping region of images captured by each of a plurality of cameras,
  generate a directed graph including nodes corresponding to person features obtained from each of a plurality of person images included in the plurality of obtained pair images,
  acquire weights of links between the nodes in the generated directed graph based on a number of person images with similar person features between the nodes, and
  determine a combination of the person features in which a number of the person images with the similar person features in the plurality of pair images is maximized based on the acquired weights of the links.

10. The information processing apparatus according to claim 9, wherein the generated directed graph includes:
  two nodes corresponding to each of person features of two person images included in each of the plurality of pair images, arranged in order in a direction from a starting point to a terminal point, and
  two parent nodes of a first pair image among the plurality of pair images and two child nodes of a second pair image among the plurality of pair images, coupled to one another by the links.

11. The information processing apparatus according to claim 9, wherein the one or more processors are further configured to
  determine a combination of the nodes in which a sum of the weights of the links in a path from a starting point to a terminal point of the directed graph is maximized by searching for the combination of the person features in which the total number of the person images with the similar person features is maximized in the plurality of pair images according to a Dijkstra method.

12. The information processing apparatus according to claim 9, wherein the one or more processors are further configured to:
  correct, for each of the plurality of pair images, one of the person features of the two person images that is not included in the combination, to the person feature that is included in the combination,
  acquire a distance matrix by acquiring, for each of combinations of the person images, a person feature distance between the person images by using the corrected person features, cluster the person images included in a dataset of the plurality of pair images based on the calculated distance matrix,
generate a pseudo label for each of clusters obtained as a result of the clustering, and
generate, as training data used for machine learning of a machine learning model that classifies the person images into classes of the pseudo labels, the training data in which the person images included in the dataset of the plurality of pair images are explanatory variables and the pseudo labels that are correct are response variables.

* * * * *